(12) United States Patent
Suzuki et al.

(10) Patent No.: US 6,403,166 B1
(45) Date of Patent: Jun. 11, 2002

(54) MICROCAPSULES USED IN IMAGE-FORMING SUBSTRATE AND PROCESS OF PRODUCING SAME

(75) Inventors: Minoru Suzuki, Tochigi; Hiroshi Orita; Hiroyuki Saito, both of Saitama; Katsuyoshi Suzuki; Koichi Furusawa, both of Tokyo, all of (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/656,754

(22) Filed: Sep. 7, 2000

Related U.S. Application Data

(62) Division of application No. 09/177,565, filed on Oct. 23, 1998, now Pat. No. 6,139,914.

(30) Foreign Application Priority Data

Oct. 24, 1997 (JP) ............................................ 09-309732
Dec. 1, 1997 (JP) ............................................ 09-345864

(51) Int. Cl.$^7$ ............................................... B05D 1/06
(52) U.S. Cl. ..................... 427/475; 427/212; 427/282; 427/340
(58) Field of Search .......................... 427/45, 475, 180, 427/212, 213, 213.31, 272, 282, 337, 340; 430/138, 211

(56) References Cited

U.S. PATENT DOCUMENTS

| | | |
|---|---|---|
| 4,399,209 A | 8/1983 | Sanders et al. |
| 4,440,846 A | 4/1984 | Sanders et al. |
| 4,644,376 A | 2/1987 | Usami et al. |
| 4,702,932 A | * 10/1987 | Cosentine et al. |
| 5,104,767 A | 4/1992 | Nakamura |
| 5,275,693 A | * 1/1994 | Nakama |
| 5,645,920 A | 7/1997 | Nishiyama |

FOREIGN PATENT DOCUMENTS

| | | |
|---|---|---|
| JP | 61-13778 | 6/1986 |
| JP | 61137787 | 6/1986 |
| JP | 4-4960 | 1/1992 |

OTHER PUBLICATIONS

An English Language abstract of JP 61-13778.
English Language Abstract of JP 61-137787.

* cited by examiner

*Primary Examiner*—Fred J. Parker
(74) *Attorney, Agent, or Firm*—Greenblum & Bernstein, P.L.C.

(57) ABSTRACT

Process for forming fine speckle-shaped depressions over an outer surface of a shell wall of a microcapsule encapsulating a dye, including cohering fine ceramic particles to the microcapsule, due to triboelectrification acting therebetween, such that a plurality of fine spaces are defined among the cohered fine ceramic particles around the outer surface of the shell wall; immersing the microcapsule with the cohered fine ceramic particles in a solvent over a predetermined period of time such that a plurality of fine speckle-shaped depressions is formed in the outer surface of the shell wall at locations corresponding to the plurality of fine spaces defined around the outer surface of the shell wall; withdrawing the microcapsule with the cohered fine ceramic particles from the solvent; and washing off retained solvent from the microcapsule with the cohered fine ceramic particles, wherein the period of time, over which the microcapsule with the cohered fine ceramic particles is immersed in the solvent, is regulated such that the fine speckle-shaped depressions do not completely pass through the shell wall.

1 Claim, 23 Drawing Sheets

(12Y,12M,12Y)   (12C,12M,12Y)

(12C,12M,12Y)

MICROCAPSULES USED IN IMAGE-FORMING SUBSTRATE AND PROCESS OF PRODUCING SAME

CROSS-REFERENCE TO RELATED APPLICATIONS

This application is a division of Application Ser. No. 09/177,565, filed Oct. 23, 1998, U.S. Pat. No. 6,139,914 and claims priority of Japanese Application Nos. 9-309732 filed Oct. 24, 1997, and 9-345864 filed Dec. 1, 1997. The entire disclosure of application Ser. No. 09/177,565 is considered as being part of the disclosure of this application, and the entire disclosure of application Ser. No. 09/177,565 is expressly incorporated by reference herein in its entirety.

BACKGROUND OF THE INVENTION

1. Field of the Invention

The present invention relates to microcapsules filled with dye, used in an image-forming substrate, in which the microcapsules are formed as a layer of microcapsules, with an image being formed by selectively squashing and compacting the microcapsules in the layer of microcapsules, and also relates to a process of producing the microcapsules.

2. Description of the Related Art

In a conventional type of image-forming substrate coated with a layer of microcapsules filled with dye or ink, a shell of each microcapsule is formed from a suitable photo-setting resin, and an optical image is recorded and formed as a latent image on the layer of microcapsules by exposing it to light rays in accordance with image-pixel signals. Then, the latent image is developed by exerting a pressure on the layer of microcapsules. Namely, the microcapsules, which are not exposed to the light rays, are broken, whereby the dye or ink discharges out of the broken microcapsules, and thus the latent image is visually developed by the discharging of the dye or ink.

Conventionally, when a microcapsule is broken, it is impossible to adjust an amount of dye or ink that discharges out of the broken microcapsule. Namely, it is impossible to obtain a variation in density (gradation) of a dot to be produced by the broken microcapsules.

Also, each of the conventional image-forming substrates must be packed so as to be protected from being exposed to light, resulting in a wastage of materials. Further, the image-forming substrates must be handled such that they are not subjected to excess pressure due to the softness of unexposed microcapsules, resulting in an undesired discharging of the dye or ink.

SUMMARY OF THE INVENTION

Therefore, an object of the present invention is to provide microcapsules filled with dye, to be used in an image-forming substrate, wherein it is possible to discharge an adjustable amount of dye or ink from a microcapsule by squashing and compacting the same without any breakage of the microcapsule.

Also, another object of the present invention is to provide a process for producing the microcapsules as mentioned above.

In accordance with a first aspect of the present invention, there is provided a microcapsule comprising: a shell wall, formed of a shape memory resin, that includes bottomed fissures; and a dye encapsulated in the shell wall. The shell wall exhibits a temperature/pressure characteristic such that the bottomed fissures become through-hole fissures when the shell wall is squashed and compacted under a predetermined pressure at a predetermined temperature, whereby a seepage of the dye from the squashed and compacted shell wall via the through-hole fissures is adjustable.

The bottomed fissures may be formed as outer fissures which penetrate from an outer surface of the shell wall toward an inner surface. Also, the bottomed fissures may be formed as inner fissures which penetrate from an inner surface of the shell wall toward an outer surface thereof. Further, the bottomed fissures may comprise outer fissures penetrating from an outer surface of the shell wall toward an inner surface thereof, and inner fissures penetrating from the inner surface of the shell wall toward the outer surface.

The dye may be a liquid dye. Also, the dye may be a wax-type dye that exhibits a solid-phase at a temperature below the predetermined temperature. Namely, when the wax-type dye is heated above the predetermined temperature, this wax-type dye is thermally fused, and exhibits a liquid-phase.

In accordance with the first aspect of the present invention, there is provided a process for fissuring a shell wall, formed of a shape memory resin, of a microcapsule encapsulating a liquid dye, which comprises the steps of: irradiating the microcapsule with high frequency electromagnetic waves, such as microwaves, so as to thermally heat and expand the liquid dye; and penetrating outer fissures in the shell wall from an outer surface of the shell wall toward an inner surface of the shell wall by the thermal heating and expansion of the liquid dye. The thermal heating and expansion of the liquid dye is regulated such that the outer fissures do not completely pass through the shell wall.

In accordance with the first aspect of the present invention, there is provided another process for fissuring a shell wall, formed of a shape memory resin, of a microcapsule encapsulating a dye, which comprises the steps of: suddenly and drastically cooling the microcapsule such that only the shell wall abruptly hardens and contracts; and penetrating inner fissures in the shell wall from an inner surface of the shell wall toward an outer surface of the shell wall due to the abrupt hardening and contraction of the shell wall. The abrupt hardening and contraction of the shell wall is regulated such that the inner fissures do not completely pass through the shell wall.

In accordance with the first aspect of the present invention, there is provided still another process for fissuring a shell wall, formed of a shape memory resin, of a microcapsule encapsulating a dye, which comprises the steps of: cooling the microcapsule such that the shell wall exhibits a brittleness; exerting a pressing force on the microcapsule so as to deform the shell wall; and penetrating inner and outer fissures in the shell wall by the exertion of the pressing force on the microcapsule. The exertion of the pressing force on the microcapsule is regulated such that the inner and outer fissures do not completely pass through the shell wall.

In accordance with the first aspect of the present invention, there is provided still yet another process for fissuring a shell wall, formed of a shape memory resin, of a microcapsule encapsulating a dye, which comprises the steps of: treating the microcapsule with a corrosive liquid such that outer fissures are chemically developed over an outer surface of the shell wall; and washing off the corrosive liquid from the microcapsule before the outer fissures completely pass through the shell wall.

In accordance with a second aspect of the present invention, there is provided another type of microcapsule comprising: a shell wall, formed of a shape memory resin, that is formed with fine speckle-like depressions that do not completely pass through the shell wall; and a dye encapsulated in the shell wall. The shell wall exhibits a temperature/pressure characteristic such that the fine speckle-like depressions become through-holes when the shell wall is squashed and compacted under a predetermined pressure at a predetermined temperature, whereby a seepage of the dye from the squashed and compacted shell wall via the through-holes is adjustable.

Similar to the first aspect of the present invention, the dye may be a liquid dye. Also, the dye may be a wax-type dye that exhibits a solid-phase at a temperature below the predetermined temperature Namely, when the wax-type dye is heated above the predetermined temperature, this wax-type dye is thermally fused, and exhibits a liquid-phase.

In accordance with the second aspect of the present invention, there is provided a process for forming fine speckle-like depressions over an outer surface of a shell wall of a microcapsule encapsulating a dye, which comprises the steps of: cohering fine ceramic particles to the microcapsule, due to triboelectrification acting therebetween, such that a plurality of fine spaces are defined among the cohered fine ceramic particles around the outer surface of the shell wall; immersing the microcapsule with the cohered fine ceramic particles in a solvent over a predetermined period of time such that a plurality of fine speckle-like depressions is formed in the outer surface of the shell wall at locations corresponding to the plurality of fine spaces defined around the outer surface of the shell; withdrawing the microcapsule with the cohered fine ceramic particles from the solvent; and washing off retained solvent from the microcapsule with the cohered fine ceramic particles. The period of time, over which the microcapsule with the cohered fine ceramic particles is immersed in the solvent, is regulated such that the fine speckle-like depressions do not completely pass through the shell wall.

BRIEF DESCRIPTION OF THE DRAWINGS

These object and other objects of the present invention will be better understood from the following description, with reference to the accompanying drawings in which.

DESCRIPTION OF THE PREFERRED EMBODIMENTS

Figure 1:
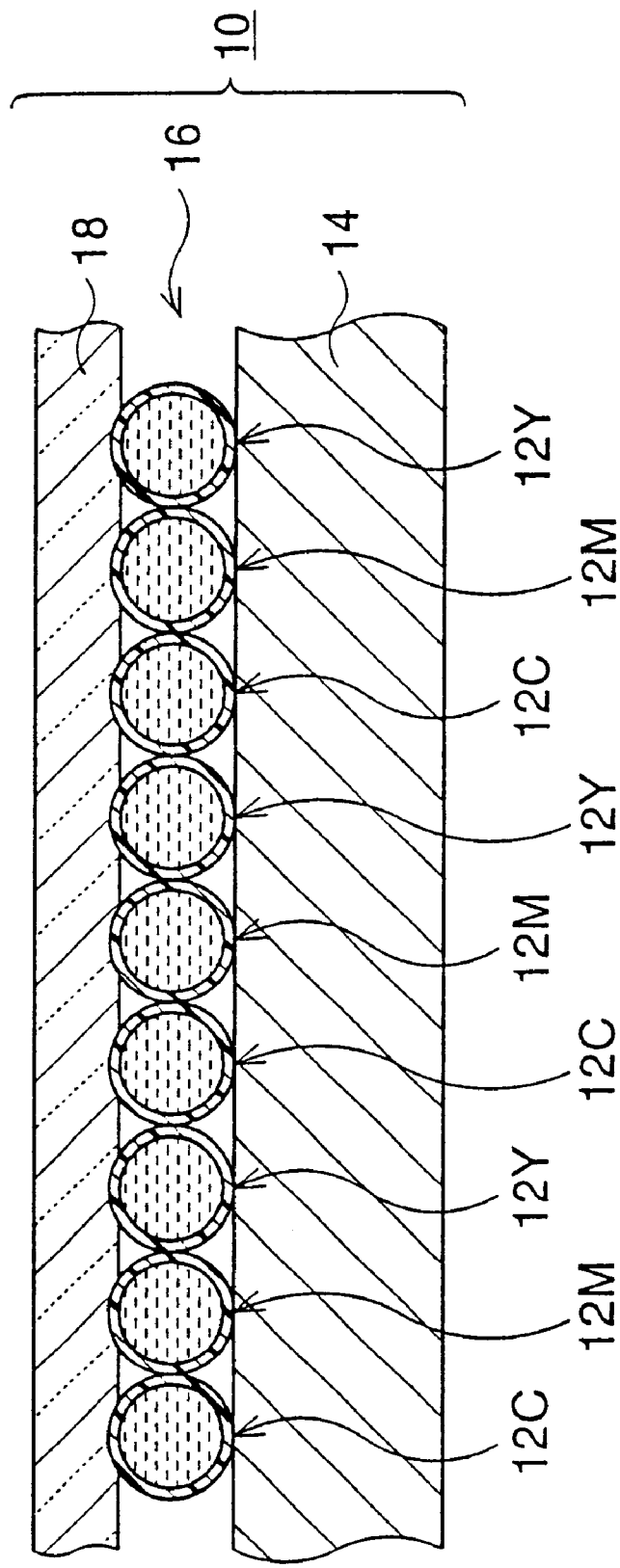
FIG. 1 is a schematic conceptual cross-sectional view showing an image-forming substrate, using three types of microcapsules: cyan microcapsule filled with a cyan dye; magenta microcapsule filled with a magenta dye; and yellow microcapsule filled with a yellow dye, in accordance with a first embodiment of the present invention.

FIG. 1 shows an image-forming substrate, generally indicated by reference numeral 10, in which three types of microcapsules 12C, 12M and 12Y, constituted according to the present invention, are used, and each of these three types of the microcapsules 12C, 12M and 12Y is referred to as a first embodiment of the microcapsules according to the present invention hereinafter.

In this first embodiment, a first type of microcapsules 12C is filled with a cyan dye; a second type of microcapsules 12M is filled with a magenta dye; and a third type of microcapsules 12Y is filled with a yellow dye. Each of these dyes may be comprised of either a liquid dye, such as an ink, or a semi-solid or solid wax-type dye.

The image-forming substrate 10 has a sheet of paper 14, over a surface of which the three types of microcapsules 12C, 12M and 12Y are uniformly distributed so as to form a layer of microcapsules 16. For the uniform formation of the layer of microcapsules 16, for example, the same amounts of cyan, magenta and yellow microcapsules 12C, 12M and 12Y are homogeneously mixed with a suitable binder solution to form a suspension, and the sheet of paper 14 is coated with the binder solution, containing the suspension of microcapsules 12C, 12M and 12Y, by using an atomizer.

In FIG. 1, for the convenience of illustration, although the microcapsule layer 16 is shown as having a thickness corresponding to the diameter of the microcapsules 12C, 12M and 12Y, in reality, the three types of microcapsules 12C, 12M and 12Y overlay each other, and thus the microcapsule layer 16 has a larger thickness than the diameter of a single microcapsules 12C, 12M or 12Y. The image-forming substrate 10 further has a sheet of transparent protective film 18 covering the microcapsule layer 16.

Note, in each type of microcapsule (12C, 12M, 12Y), a shell wall of a microcapsule is formed of a synthetic resin material, usually colored white, which is the same color as the sheet of paper 14. Accordingly, if the sheet of paper 14 is colored with a single color pigment, the resin material of the microcapsules 12C, 12M and 12Y may be colored by the same single color pigment.

According to this first embodiment, in each type of microcapsule (12C, 12M, 12Y), the shell wall of a microcapsule is made of a shape memory resin. For example, the shape memory resin is represented by a polyurethane-based-resin, such as polynorbornene, trans-1, 4-polyisoprene polyurethane. As other types of shape memory resin, a polyimide-based resin, a polyamide-based resin, a polyvinyl-chloride-based resin, a polyester-based resin and so on are also known.

Figure 2:
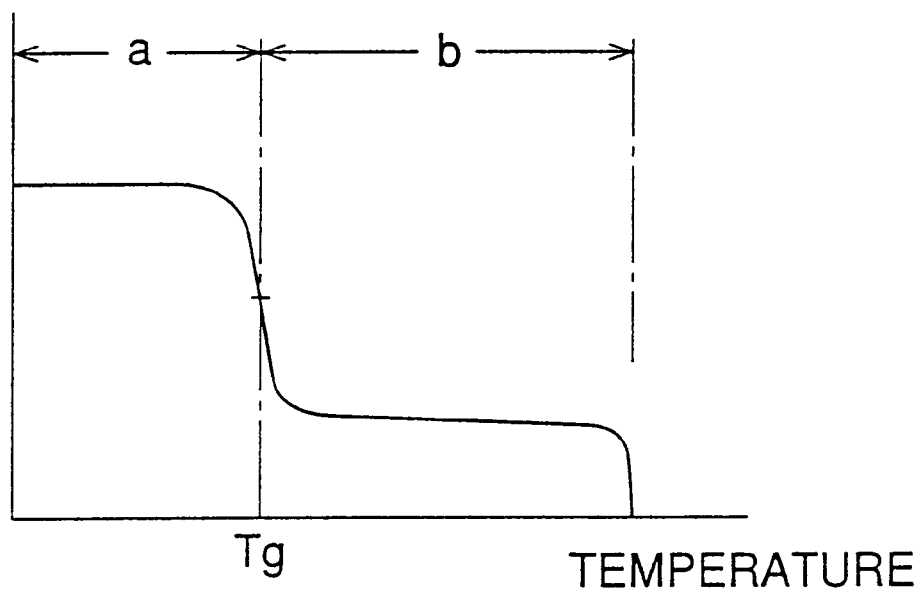
FIG. 2 is a graph showing a characteristic curve of a longitudinal elasticity coefficient of a shape memory resin.

In general, as shown in a graph of FIG. 2, the shape memory resin exhibits a coefficient of longitudinal elasticity, which abruptly changes at a glass-transition temperature boundary $Tg_g$. In the shape memory resin, Brownian movement of the molecular chains is stopped in a low-temperature area "a", which is below the glass-transition temperature $T_g$, and thus the shape memory resin exhibits a glass-like phase. On the other hand, Brownian movement of the molecular chains becomes increasingly energetic in a high-temperature area "b", which is above the glass-transition temperature $T_g$, and thus the shape memory resin exhibits a rubber elasticity.

The shape memory resin is named due to the following shape memory characteristic: once a mass of the shape memory resin is worked into a finished article in the low-temperature area "a", and is heated to beyond the glass-transition temperature $T_g$, the article becomes freely deformable. After the shaped article is deformed into another shape, and cooled to below the glass-transition temperature $T_g$, the most recent shape of the article is fixed and maintained. Nevertheless, when the deformed article is again heated to above the glass-transition temperature $T_g$, without being subjected to any load or external force, the deformed article returns to the original shape.

In the microcapsules 12C, 12M and 12Y according to the present invention, the shape memory characteristic per se is not utilized, but the characteristic abrupt change in the longitudinal elasticity coefficient of the shape memory resin is utilized, as stated in detail hereinafter.

Figure 3:
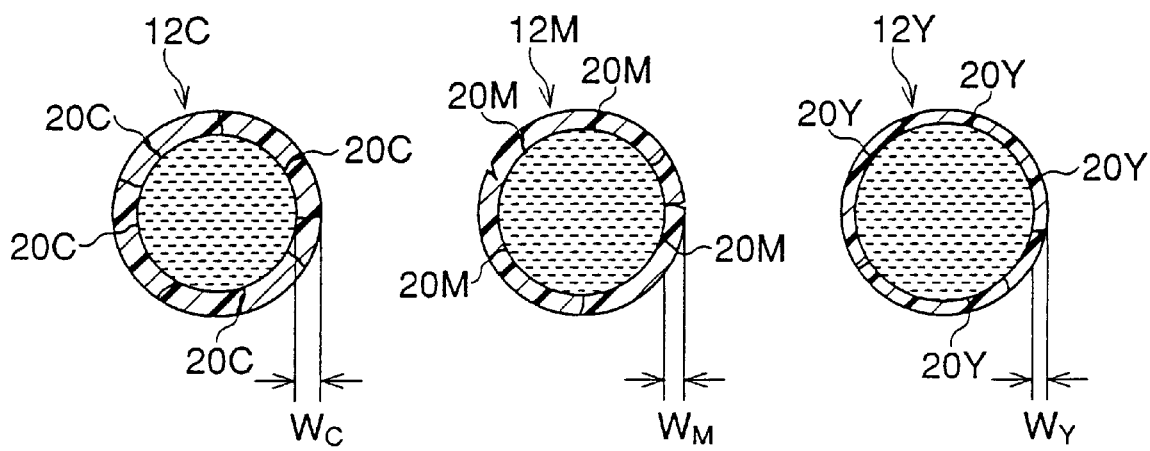
FIG. 3 is a schematic cross-sectional view showing different shell wall thicknesses of the respective cyan, magenta and yellow microcapsules shown in FIG. 1.

As shown in FIG. 3, in the first embodiment, the shell walls of the respective microcapsules 12C, 12M and 12Y feature differing thicknesses $W_C$, $W_M$ and $W_Y$, respectively. Namely, the thickness $W_C$ of the cyan microcapsules 12C is larger than the thickness $W_M$ of the magenta microcapsules 12M, and the thickness $W_M$ of the magenta microcapsules 12M is larger than the thickness $W_Y$ of the yellow microcapsules 12Y. Further, the shell walls of the respective microcapsules 12C, 12M and 12Y are formed with outer cracks or fissures 20C, 20M and 20Y, respectively. As representatively shown in FIG. 4, the outer fissures 20C penetrate into the shell wall of a microcapsule 12C from the outer surface of the shell wall toward the inner surface thereof, but the outer fissures 20C do not completely pass through the microcapsule shell wall, i.e. they are bottomed fissures. Of course, the same is true for the magenta microcapsules 12M and the yellow microcapsules 12Y.

Figure 5:
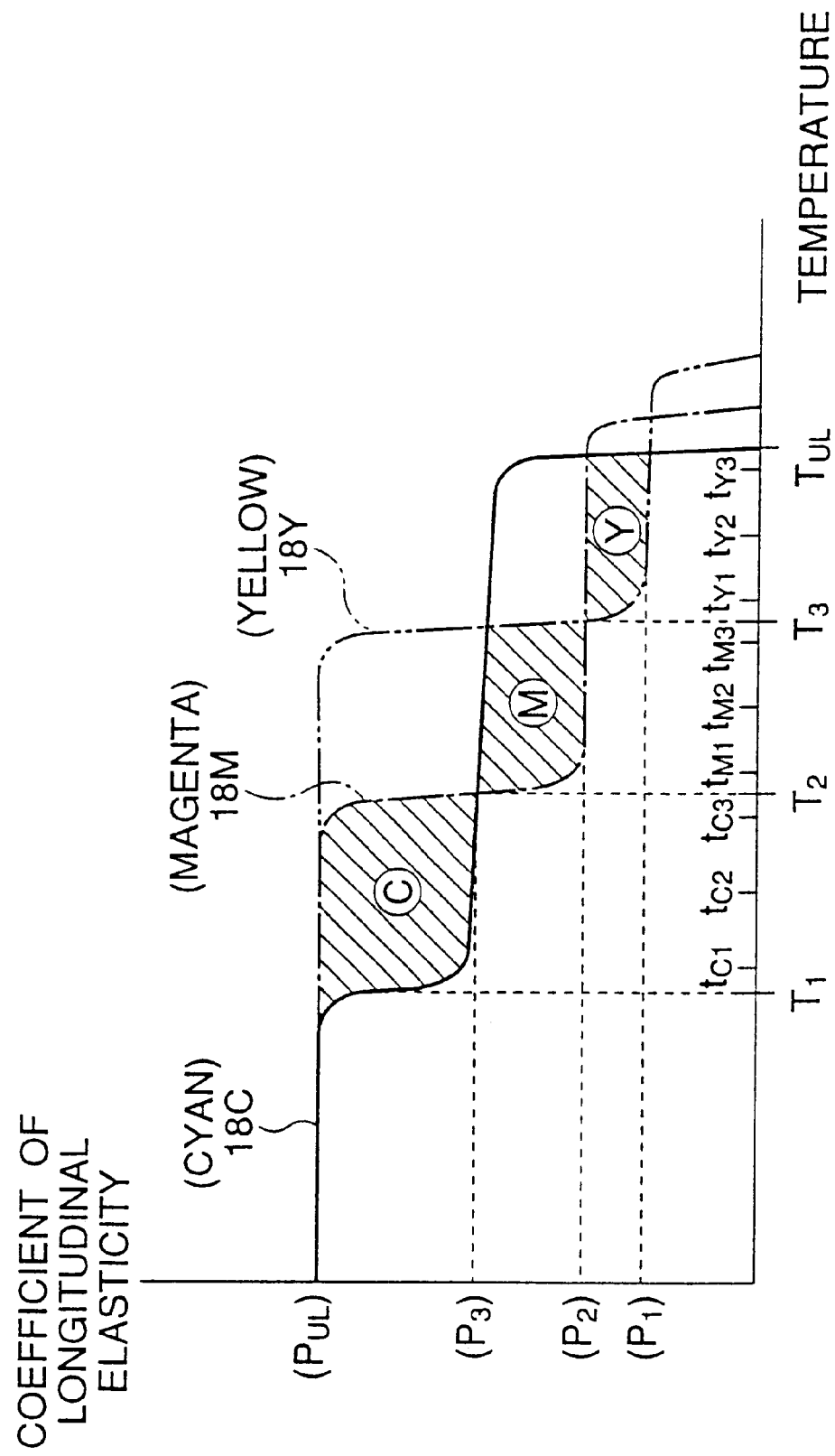
FIG. 5 is a graph showing temperature/pressure compacting characteristics of the respective cyan, magenta and yellow microcapsules shown in FIG. 1, with respective hatched area indicating each of a cyan-producing area, a magenta-producing area and a yellow-producing area.

As shown in a graph of FIG. 5, a shape memory resin of the cyan microcapsules 12C is prepared so as to exhibit a characteristic longitudinal elasticity coefficient having a glass-transition temperature $T_1$, indicated by a solid line; a shape memory resin of the magenta microcapsules 12M is prepared so as to exhibit a characteristic longitudinal elasticity coefficient having a glass-transition temperature $T_2$, indicated by a single-chained line; and a shape memory resin of the yellow microcapsules 12Y is prepared so as to exhibit a characteristic longitudinal elasticity coefficient having a glass-transition temperature $T_3$, indicated by a double-chained line.

Note, by suitably varying compositions of the shape memory resin and/or by selecting a suitable one from among various types of shape memory resin, it is possible to obtain the respective shape memory resins, with the glass-transition temperatures $T_1$, $T_2$ and $T_3$. For example, the respective glass-transition temperatures $T_1$, $T_2$ and $T_3$ may be 70° C., 110° C. and 130° C.

Also, as shown in the graph of FIG. 5, the wall thickness $W_C$ of the cyan microcapsules 12C, having the cracks or fissures 20C, is selected such that each cyan microcapsule 12C is elastically squashed and compacted under a compacting pressure that lies between a critical compacting pressure $P_3$ and an upper limit pressure $P_{UL}$, when each cyan microcapsule 12C is heated to a temperature between the glass-transition temperatures $T_1$ and $T_2$; the wall thickness $W_M$ of the magenta microcapsules 12M, having the cracks or fissures 20M, is selected such that each magenta microcapsule 12M is elastically squashed and compacted under a compacting pressure that lies between a critical compacting pressure $P_2$ and the critical compacting pressure $P_3$ (FIG. 5), when each magenta microcapsule 12M is heated to a temperature between the glass-transition temperatures $T_2$ and $T_3$; and the wall thickness $W_Y$ of the yellow microcapsules 12Y, having the cracks or fissures 20Y, is selected such that each yellow microcapsule 12Y is elastically squashed and compacted under a compacting pressure that lies between a critical compacting pressure $P_1$ and the critical compacting pressure $P_2$ (FIG. 5), when each yellow microcapsule 12Y is heated to a temperature between the glass-transition temperature $T_3$ and an upper limit temperature $T_{UL}$.

Note, the upper limit pressure $P_{UL}$ and the upper limit temperature $T_{UL}$ are suitably set in view of the characteristics of the used shape memory resins.

Accordingly, by suitably selecting a heating temperature and a compacting pressure, which should be exerted on the image-forming sheet 10, it is possible to selectively squash and compact the cyan, magenta and yellow microcapsules 12C, 12M and 12Y.

Figure 6:
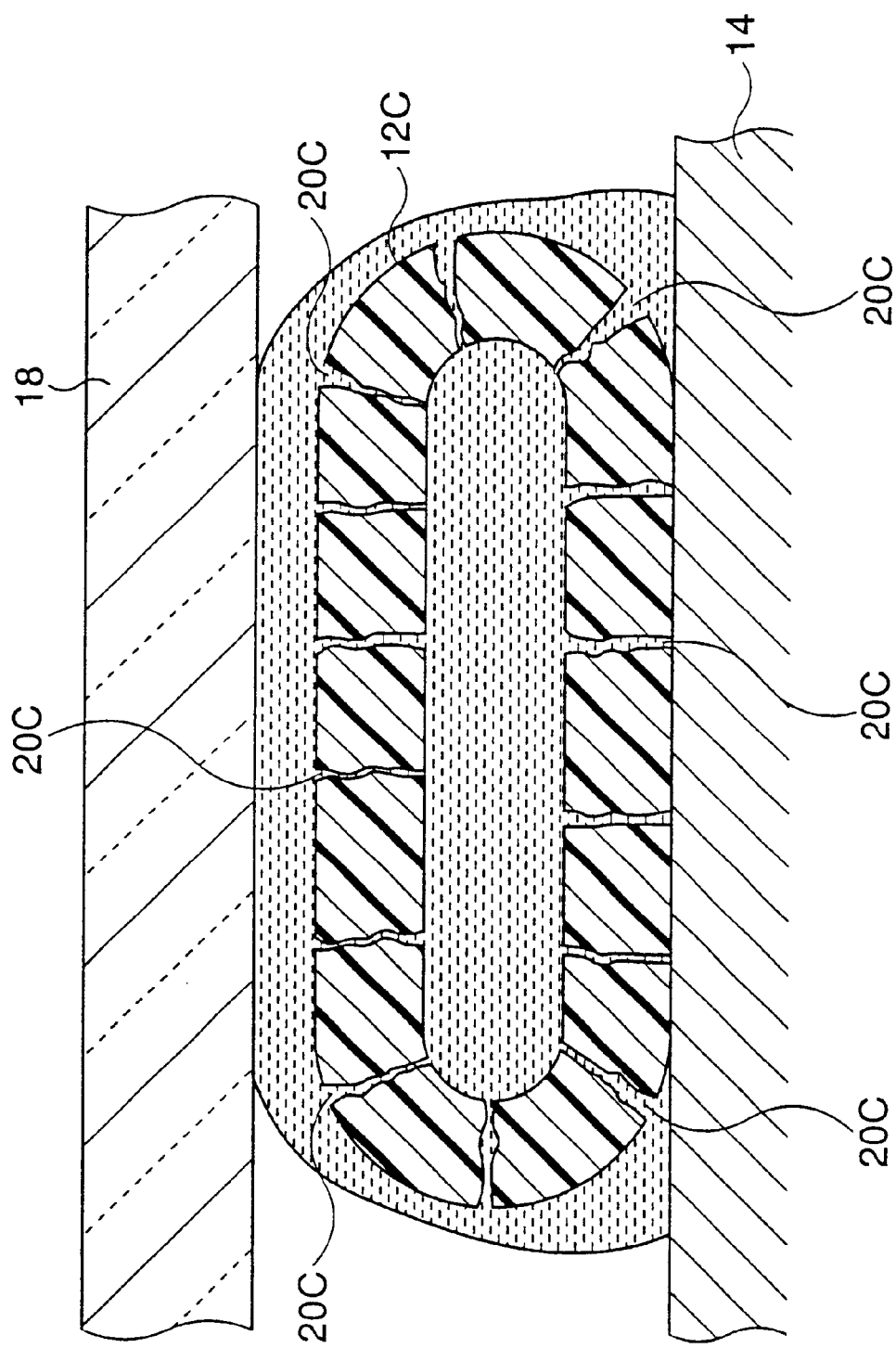
FIG. 6 is an enlarged schematic conceptual cross-sectional view, similar to FIG. 1, showing a compacted cyan microcapsule included in the image-forming substrate.

For example, if the selected heating temperature and compacting pressure fall within a hatched cyan area C (FIG. 5), defined by a temperature range between the glass-transition temperatures $T_1$ and $T_2$ and by a pressure range between the critical compacting pressure $P_3$ and the upper limit pressure $P_{UL}$, only the cyan microcapsules 12C are elastically squashed and compacted. Thus, as shown in FIG. 6, in the squashed and compacted cyan microcapsule 12C, the outer cracks or fissures 20C completely pass through the microcapsule shell wall, i.e. the outer cracks or fissures 20C become through-hole fissures, so that the liquid cyan dye seeps from the cyan microcapsule 12C through the opened outer cracks or fissures 20C. Namely, the seepage of the liquid cyan dye from the squashed and compacted cyan microcapsule 12C can be performed without any complete breakage of the microcapsule 12C. This feature is significant, because it is possible to adjust an amount of the seepage of the liquid cyan dye by regulating a temperature to be applied to the microcapsule 12C within the range between the glass-transition temperatures $T_1$ and $T_2$, i.e. by regulating a thermal expansion of the liquid cyan dye encapsulated in the microcapsule shell wall, under the compacting pressure that lies between the critical compacting pressure $P_3$ and the upper limit pressure $P_{UL}$ (FIG. 5).

Of course, the same is true for the microcapsule 12M and the microcapsule 12Y. Namely, by regulating a temperature, to be applied to the magenta microcapsule 12M, within a hatched magenta area M (FIG. 5), defined by a temperature range between the glass-transition temperatures $T_2$ and $T_3$ and by a pressure range between the critical compacting pressures $P_2$ and $P_3$, it is possible to adjust an amount of seepage of the liquid magenta dye from the squashed and compacted magenta microcapsule 12M. Also, by regulating a temperature, to be applied to the yellow microcapsule 12Y, within a hatched yellow area Y (FIG. 5), defined by a temperature range between the glass-transition temperatures $T_3$ and $T_{UL}$ and by a pressure range between the critical compacting pressures $P_1$ and $P_2$, it is possible to adjust an amount of seepage of the liquid yellow dye from the squashed and compacted yellow microcapsule 12Y. Thus, the microcapsules exhibit temperature/pressure characteristics such that when said microcapsules are squashed and compacted under different combined predetermined pressure and predetermined temperature conditions, e.g., under different set combined pressure and temperature conditions, seepage of the dyes from the squashed and compacted microcapsules is obtained by said set combined pressure and temperature conditions.

When a liquid dye is encapsulated, it is possible to utilize a well-known coacervation method to produce each of the types of microcapsules 12C, 12M and 12Y, having no outer fissures (20C, 20M, 20Y). Also, a polymerization method, such as interfacial polymerization, in-situ polymerization or the like, may be utilized for the production of the microcapsules 12C, 12M and 12Y. In either case, the microcapsules 12C, 12M and 12Y may have an average diameter of several microns, for example, 5 $\mu$m to 10 $\mu$m.

Figure 4:
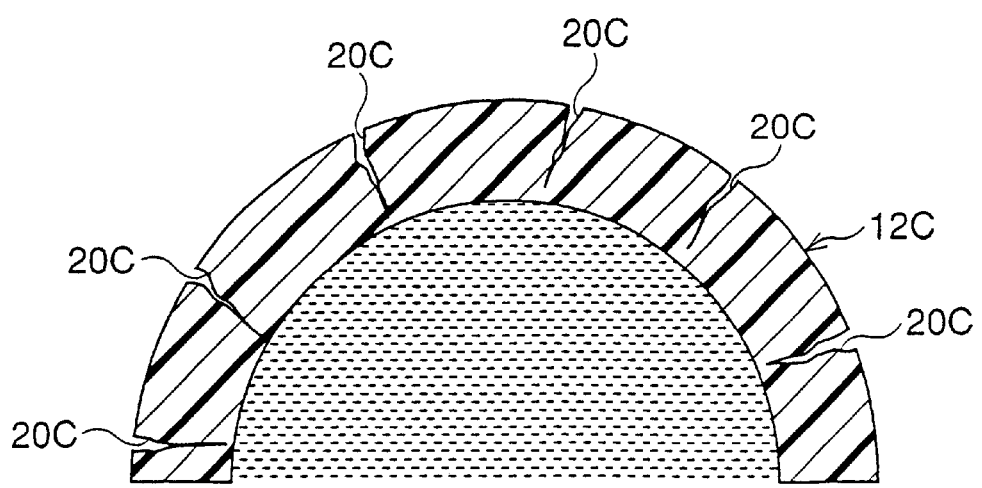
FIG. 4 is an enlarged sectional view partially showing the cyan microcapsule of FIG. 3.
Figure 7:
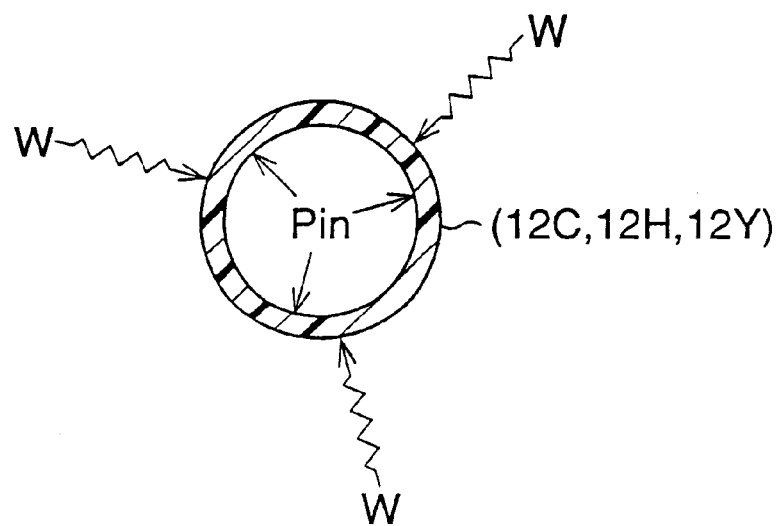
FIG. 7 is a view for explaining a first embodiment of a process for fissuring a shell wall of the microcapsule, according to the first embodiment of the present invention.
Figure 8:
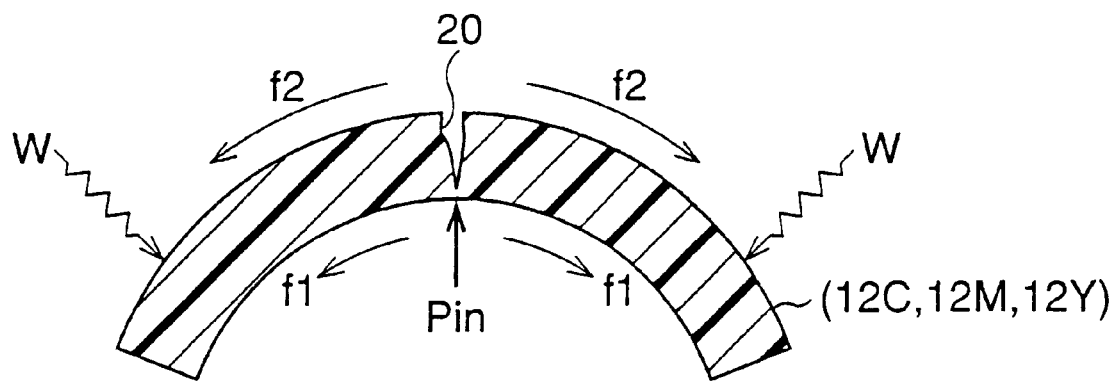
FIG. 8 is another view for explaining the first embodiment of the fissuring process shown in FIG. 7.

The produced microcapsules (12C, 12M, 12Y), having no outer fissures (20C, 20M, 20Y), may be cracked and fissured by a first embodiment of a fissuring process, as shown in FIGS. 7 and 8. In particular, each of the microcapsules (12C, 12M, 12Y) is irradiated with high frequency electromagnetic waves W, such as microwaves, as shown in FIG. 7, and the liquid dye, encapsulated in the microcapsule shell wall, is abruptly heated. Accordingly, the liquid dye thermally expands in an instant so that an inner pressure Pin of the microcapsule shell wall is abruptly and drastically increased. Thus, as shown in FIG. 8, the microcapsule shell wall is subjected to inner tensile forces $f_1$ and outer tensile forces $f_2$, with the outer tensile forces $f_2$ being larger than the inner tensile forces $f_1$, and thus an outer fissure 20 is generated at a weakened location on the outer surface of the microcapsule shell wall. Of course, the irradiation of the microcapsule with the microwaves is regulated such that the outer fissure 20 does not completely pass through the microcapsule shell wall. In short, according to this first embodiment of the fissuring process, it is possible to obtain the microcapsules (12C, 12M, 12Y), having the outer fissures (20C, 20M, 20Y), as shown in FIGS. 3 and 4.

Figure 9:
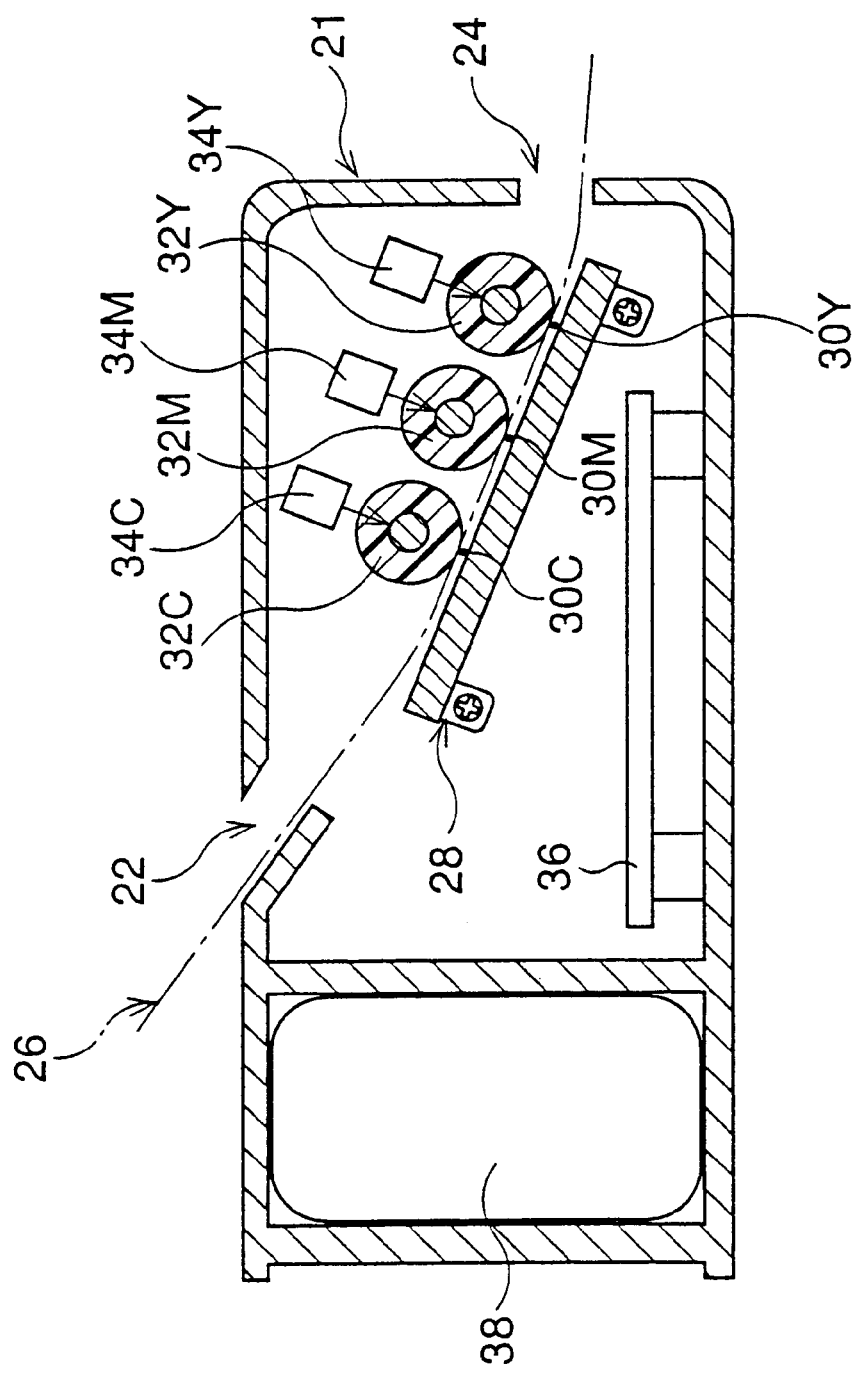
FIG. 9 is a schematic cross-sectional view of a color printer for forming a color image on the image-forming substrate shown in FIG. 1.

FIG. 9 schematically shows a thermal color printer, which is constituted as a line printer so as to form a color image on the image-forming sheet 10, which is featured by the cyan, magenta and yellow microcapsules 12C, 12M and 12Y having the respective fissures 20C, 20M and 20Y.

The color printer comprises a rectangular parallelopiped housing 21 having an entrance opening 22 and an exit opening 24 formed in a top wall and a side wall of the housing 21, respectively. The image-forming sheet 10 is introduced into the housing 21 through the entrance opening 22, and is then discharged from the exit opening 24 after the formation of a color image on the image-forming sheet 10. Note, in FIG. 9, a path 26 for movement of the image-forming sheet 10 is indicated by a chained line.

A guide plate 28 is provided in the housing 21 so as to define a part of the path 26 for the movement of the image-forming sheet 10, and a first thermal head 30C, a second thermal head 30M and a third thermal head 30Y are securely attached to a surface of the guide plate 28. Each thermal head (30C, 30M, 30Y) is formed as a line thermal head extending perpendicularly with respect to a direction of the movement of the image-forming sheet 10.

Figure 10:
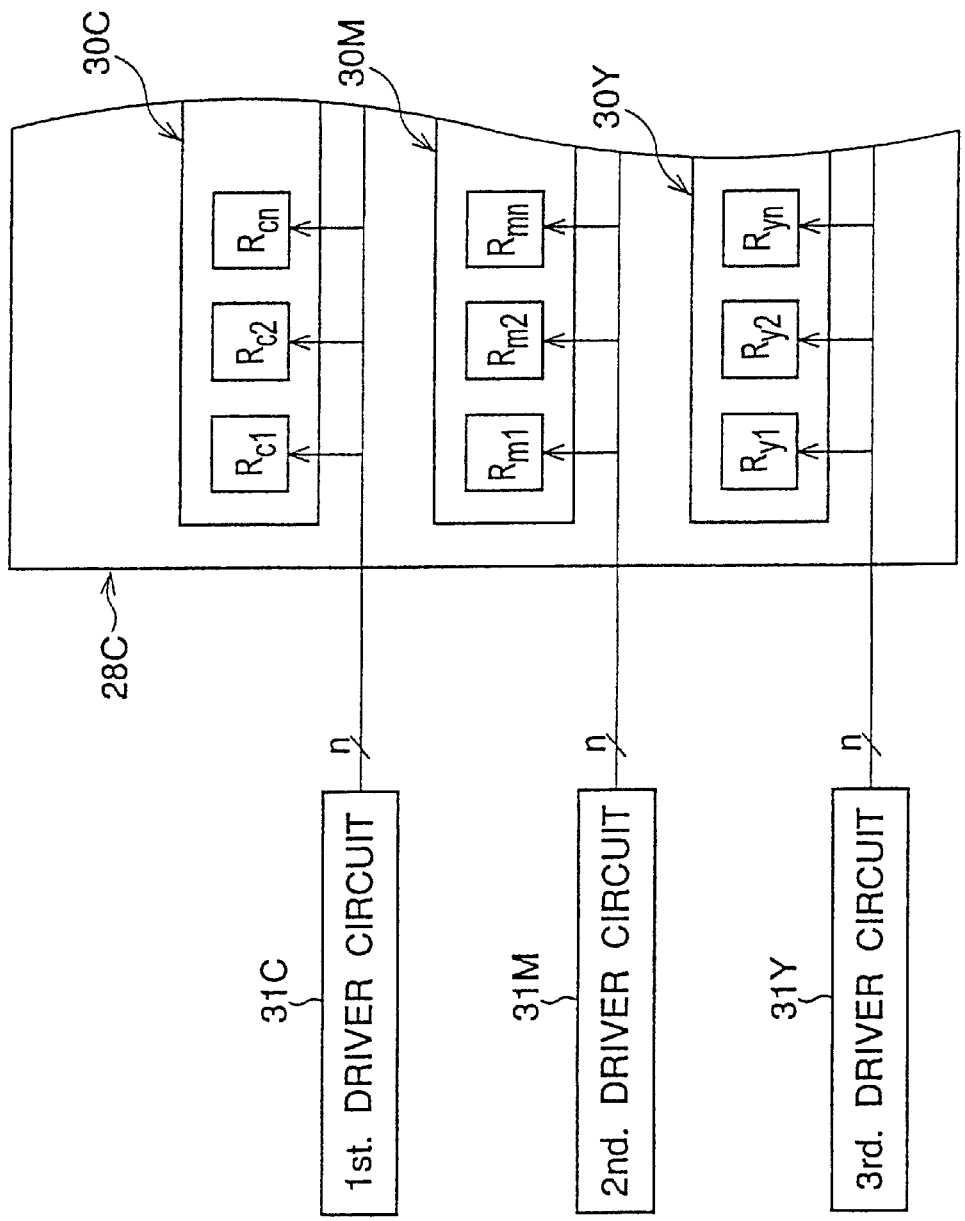
FIG. 10 is a partial schematic block diagram of three line-type thermal heads and three driver circuits therefor incorporated in the color printer of FIG. 9.

As shown in FIG. 10, the line thermal head 30C includes a plurality of heater elements or electric resistance elements $R_{c1}$ to $R_{cn}$, and these electric resistance elements $R_{c1}$ to $R_{cn}$ are aligned with each other along a length of the line thermal head 30C. Each of the electric resistance elements $R_{c1}$ to $R_{cn}$ is selectively energized by a first driver circuit 31C in accordance with a digital cyan image-pixel signal carrying a 2-bit digital gradation signal. Namely, when the digital cyan image-pixel signal has a value "1", the corresponding electric resistance element $R_{cn}$ is heated to one of temperatures $t_{C1}$, $t_{C2}$ $t_{C3}$ (FIG. 5), which fall in the range between the glass-transition temperatures $T_1$ and $T_2$, in accordance with the 2-bit digital gradation signal carried by the digital cyan image-pixel signal concerned, as stated in detail hereinafter.

Also, the line thermal head 30M includes a plurality of heater elements or electric resistance elements $R_{m1}$ to $R_{mn}$, and these electric resistance elements $R_{m1}$ to $R_{mn}$ are aligned with each other along a length of the line thermal head 30M. Each of the electric resistance elements $R_{m1}$ to $R_{mn}$ is selectively energized by a second driver circuit 31M in accordance with a magenta image-pixel signal carrying a 2-bit digital gradation signal. Namely, when the digital magenta image-pixel signal has a value "1", the corresponding electric resistance element $R_{mn}$ is heated to one of temperatures $t_{M1}$, $t_{M2}$ and $t_{M3}$ (FIG. 5), which fall in the range between the glass-transition temperatures $T_2$ and $T_3$, in accordance with the 2-bit digital gradation signal carried by the digital magenta image-pixel signal concerned, as stated in detail hereinafter.

Further, the line thermal head 30Y includes a plurality of heater elements or electric resistance elements $R_{y1}$, to $R_{yn}$, and these resistance elements are aligned with each other along a length of the line thermal head 30Y. Each of the electric resistance elements $R_{y1}$ to $R_{yn}$ is selectively energized by a third driver circuit 31Y in accordance with a yellow image-pixel signal carrying a 2-bit digital gradation signal. Namely, when the digital yellow image-pixel signal has a value "1", the corresponding electric resistance element $R_{yn}$ is heated to one of temperatures type $t_{Y1}$, $t_{Y2}$ and $t_{Y3}$ (FIG. 5), which fall in the range between the glass-transition temperatures $T_3$ and $T_{UL}$, in accordance with the 2-bit digital gradation signal carried by the digital yellow image-pixel signal concerned, as stated in detail hereinafter.

Note, the line thermal heads 30C, 30M and 30Y are arranged in sequence so that the respective heating temperatures increase in the movement direction of the image-forming substrate 10.

The color printer further comprises a first roller platen 32C, a second roller platen 32M and a third roller platen 32Y associated with the first, second and third thermal heads 30C, 30M and 30Y, respectively, and each of the roller platens 32C, 32M and 32Y may be formed of a suitable hard rubber material. The first roller platen 32C is provided with a first spring-biasing unit 34C so as to be elastically pressed against the first thermal head 30C at a pressure between the critical compacting-pressure $P_3$ and the upper limit pressure $P_{UL}$; the second roller platen 32M is provided with a second spring-biasing unit 34M so as to be elastically pressed against the second thermal head 30M at a pressure between the critical compacting-pressures $P_2$ and $P_3$; and the third roller platen 32Y is provided with a third spring-biasing unit 34Y so as to be elastically pressed against the second thermal head 30Y at a pressure between the critical compacting-pressures $P_1$ and $P_2$.

Note, the platens 32C, 32M and 32Y are arranged in sequence so that the respective pressures, exerted by the platens 32C, 32M and 32Y on the line thermal heads 30C, 30M and 30Y, decrease in the movement direction of the image-forming substrate 10.

In FIG. 9, reference 36 indicates a control circuit board for controlling a printing operation of the color printer, and reference 38 indicates an electrical main power source for electrically energizing the control circuit board 36.

Figure 11:
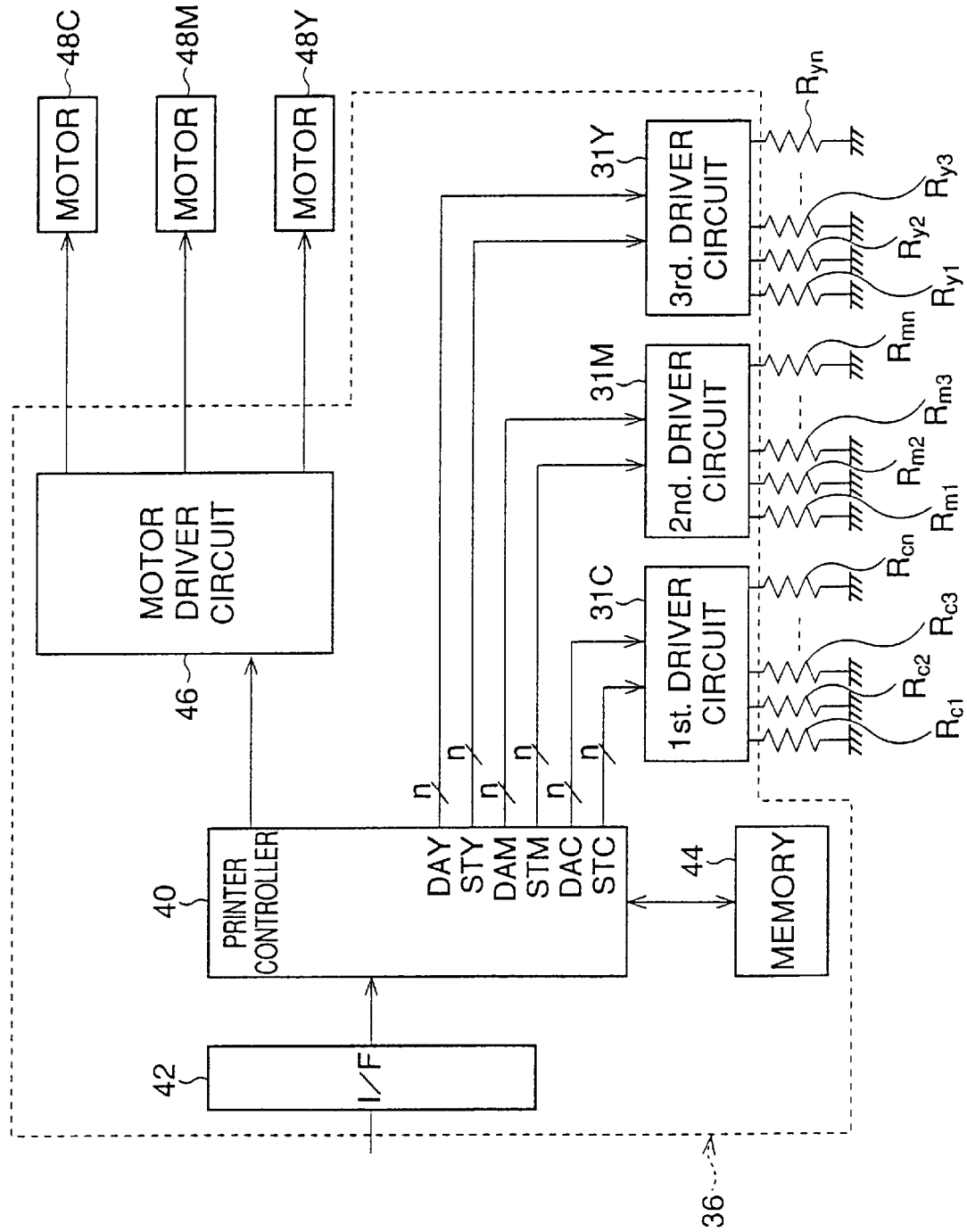
FIG. 11 is a schematic block diagram of a control board of the color printer shown in FIG. 9.

FIG. 11 shows a schematic block diagram of the control circuit board 36. As shown in this drawing, the control circuit board 36 comprises a printer controller 40 including a microcomputer. The printer controller 40 receives a series of digital color image-pixel signals from a personal computer or a word processor (not shown) through an interface circuit (I/F) 42, with each of the digital color image-pixel signals carrying a digital 2-bit gradation-signal. The received digital color image-pixel signals (i.e., digital cyan image-pixel signals carrying 2-bit digital gradation signals, digital magenta image-pixel signals carrying 2-bit digital gradation signals, and digital yellow image-pixel signals carrying 2-bit digital gradation signals) are once stored in a memory 44.

Also, the control circuit board 36 is provided with a motor driver circuit 46 for driving three electric motors 48C, 48M and 48Y, which are used to rotationally drive the roller platens 32C, 32M and 32Y, respectively. In this embodiment of the color printer, each of the motors 48C, 48M and 48Y is a stepping motor, which is driven in accordance with a series of drive pulses outputted from the motor driver circuit 46, the outputting of drive pulses from the motor driver circuit 46 to the motors 48C, 48M and 48Y being controlled by the printer controller 40.

During a printing operation, the respective roller platens 32C, 32M and 32Y are rotated in a counterclockwise direction (FIG. 9) by the motors 48C, 48M and 48Y, with a same peripheral speed. Accordingly, the image-forming sheet 10, introduced through the entrance opening 22, moves toward the exit opening 24 along the path 26. Thus, the image-forming sheet 10 is subjected to pressure ranging between the critical compacting-pressure $P_3$ and the upper limit pressure $P_{UL}$ when passing between the first line thermal head 30C and the first roller platen 32C; the image-forming sheet 10 is subjected to pressure ranging between the critical compacting-pressures $P_2$ and $P_3$ when passing between the second line thermal head 30M and the second roller platen 32M; and the image-forming sheet 10 is subjected to pressure ranging between the critical compacting-pressures $P_1$ and $P_2$ when passing between the third line thermal head 30Y and the third roller platen 32Y.

Note, in this embodiment of the color printer, the introduction of the image-forming sheet 10 into the entrance opening 22 of the printer is carried out such that the transparent protective film sheet 18 of the image-forming sheet 10 comes into contact with the thermal heads 30C, 30M and 30Y.

As is apparent from FIG. 11, the respective driver circuits 31C, 31M and 31Y for the line thermal heads 30C, 30M and 30Y are controlled by the printer controller 40. Namely, the driver circuits 31C, 31M and 31Y are controlled by n sets of strobe signals "STC" and control signals "DAC", n sets of strobe signals "STM" and control signals "DAM", and n sets of strobe signals "STY" and control signals "DAY", respectively, outputted from the printer controller 40, thereby carrying out the selective energization of the resistance elements $R_{c1}$ to $R_{cn}$, the selective energization of resistance elements $R_{m1}$ to $R_{mn}$ and the selective energization of the resistance elements $R_{y1}$, to $R_{yn}$, as stated in detail below.

Figure 12:
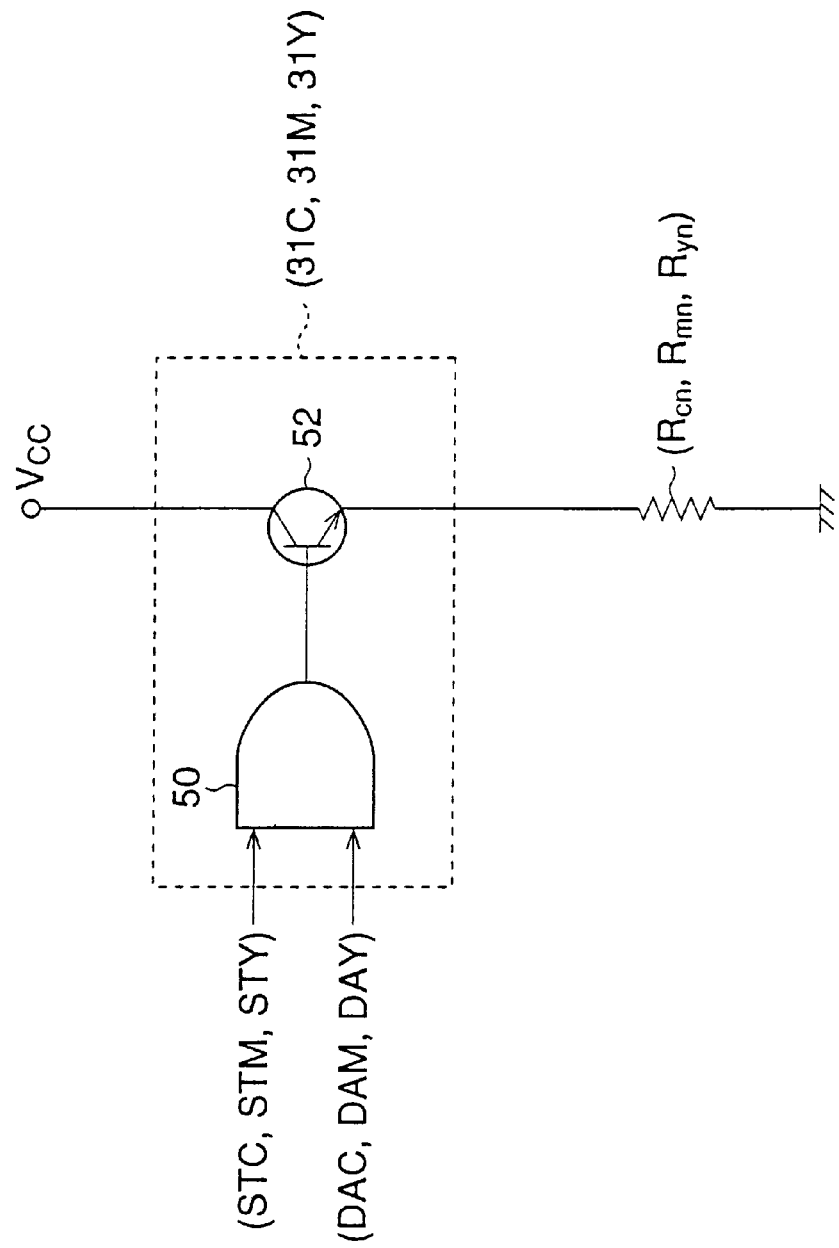
FIG. 12 is a partial block diagram representatively showing a set of an AND-gate circuit and a transistor included in each of the thermal head driver circuits of FIGS. 10 and 11.

In each driver circuit (31C, 31M, 31Y), n sets of AND-gate circuits and transistors are provided with respect to the respective electric resistance elements $R_{cn}$, $R_{mn}$ and $R_{yn}$. With reference to FIG. 12, an AND-gate circuit and a transistor in one set are representatively shown and indicated by references 50 and 52, respectively. A set of a strobe signal (STC, STM or STY) and a control signal (DAC, DAM or DAY) is inputted from the printer controller 40 to two input terminals of the AND-gate circuit 50. A base of the transistor 52 is connected to an output terminal of the AND-gate circuit 50; a collector of the transistor 52 is connected to an electric power source ($V_{cc}$); and an emitter of the transistor 52 is connected to a corresponding electric resistance element ($R_{cn}$, $R_{mn}$, $R_{yn}$).

Figure 13:
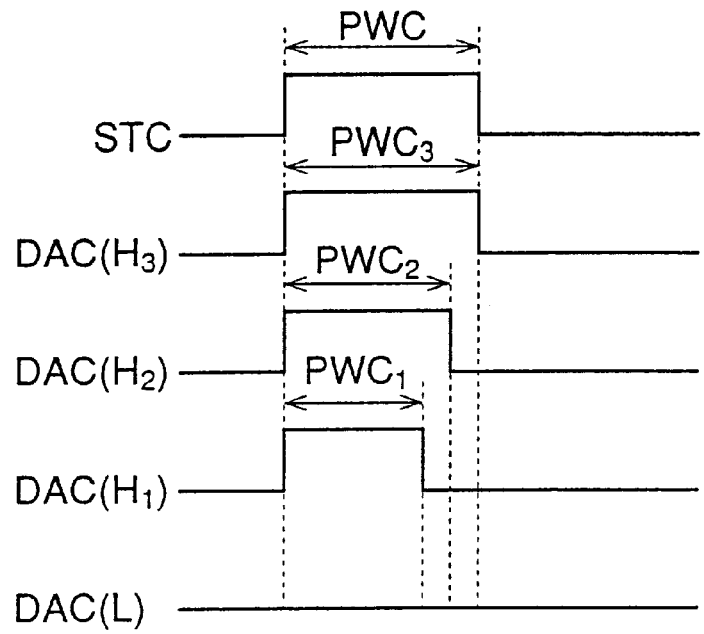
FIG. 13 is a timing chart showing a strobe signal and a control signal for electronically actuating one of the thermal head driver circuits for producing a cyan dot on the image-forming substrate of FIG. 1.

When the AND-gate circuit 50, as shown in FIG. 12, is one included in the first driver circuit 31C, a set of a strobe signal "STC" and a control signal "DAC" is outputted from the printer controller 40, and is then inputted to the input terminals of the AND-gate circuit 50. As shown in a timing chart of FIG. 13, the strobe signal "STC" has a pulse width "PWC", and the control signal "DAC" is varied in accordance with binary values of a digital cyan image-pixel signal and a 2-bit digital gradation signal carried thereby, as shown in the following TABLE:

| IMAGE-PIXEL SIGNAL (C, M, Y) | 2-BIT GRADATION SIGNAL (C, M, Y) | PULSE WIDTH OF "DAC", "DAM" AND "DAY" |
|---|---|---|
| [0] | [00] | (LOW LEVEL) |
| [1] | [01] | $PWC_1$; $PWM_1$; $PWY_1$ |
| [1] | [10] | $PWC_2$; $PWM_2$; $PWY_2$ |
| [1] | [11] | $PWC_3$; $PWM_3$; $PWY_3$ |

Namely, when the digital cyan image-pixel signal has a value "0", and when the 2-bit digital gradation signal has a value [00], the control signal "DAC" is maintained at a low-level under control of the printer controller 40. When the digital cyan image-pixel signal has a value "1", the control signal "DAC" is outputted as a high-level pulse from the printer controller 40, and a pulse width of the high-level pulse is varied in accordance with a value of the 2-bit digital gradation signal concerned.

In particular, when the 2-bit digital gradation signal has a value of [11], the high-level pulse of the control signal "DAC" has the same pulse width "$PWC_3$" as the pulse width "PWC" of the strobe signal "STC", and a corresponding one of the electric resistance elements R is electrically energized during a period corresponding to the pulse width "$PWC_3$" of the high-level pulse of the control signal "DAC", whereby the electric resistance element concerned is heated to the temperature $t_{C3}$ (FIG. 5) between the glass-transition temperatures $T_1$ and $T_2$.

Also, when the 2-bit digital gradation signal has a value of [10], the high-level pulse of the control signal "DAC" has a pulse width "$PWC_2$", shorter than the pulse width "$PWC_3$", and a corresponding one of the electric resistance elements $R_{cn}$ is electrically energized during a period corresponding to the pulse width "$PWC_2$" of the high-level pulse of the control signal "DAC", whereby the electric resistance element concerned is heated to the temperature $t_{C2}$ (FIG. 5) between the glass-transition temperatures $T_1$ and $T_2$.

Further, when the 2-bit digital gradation signal has a value of [01], the high-level pulse of the control signal "DAC" has a pulse width "$PWC_1$", shorter than the pulse width "$PWC_2$", and a corresponding one of the electric resistance elements $R_{cn}$ is electrically energized during a period corresponding to the pulse width "$PWC_1$" of the high-level pulse of the control signal "DAC", whereby the electric resistance element concerned is heated to the temperature $t_{C1}$ (FIG. 5) between the glass-transition temperatures $T_1$ and $T_2$.

Accordingly, the electric resistance element ($R_{c1}$, . . . , $R_{cn}$) corresponding to the digital cyan image-pixel signal having the value "1", is heated to one of the temperatures $t_{C1}$, $t_{C2}$ and $t_{C3}$, resulting in a production of a cyan dot on the image-forming sheet 10, due to the squashing and compacting of the cyan microcapsules 12C, which are locally heated by the electric resistance element concerned. Thus, a cyan density of the produced cyan dot varies in accordance with the heating temperature ($t_{C1}$, $t_{C2}$, $t_{C3}$) thereby obtaining a variation in density (gradation) of the cyan dot. Of course, as the heating temperature ($t_{C1}$, $t_{C2}$, $t_{C3}$) increases, the cyan density of the cyan dot becomes higher, because the liquid cyan dye, encapsulated in a cyan microcapsule shell wall (12C), is subjected to a proportionally larger thermal expansion with regard to the rise in the heating temperature ($t_{C1}$, $t_{C2}$, $t_{C3}$).

Figure 14:
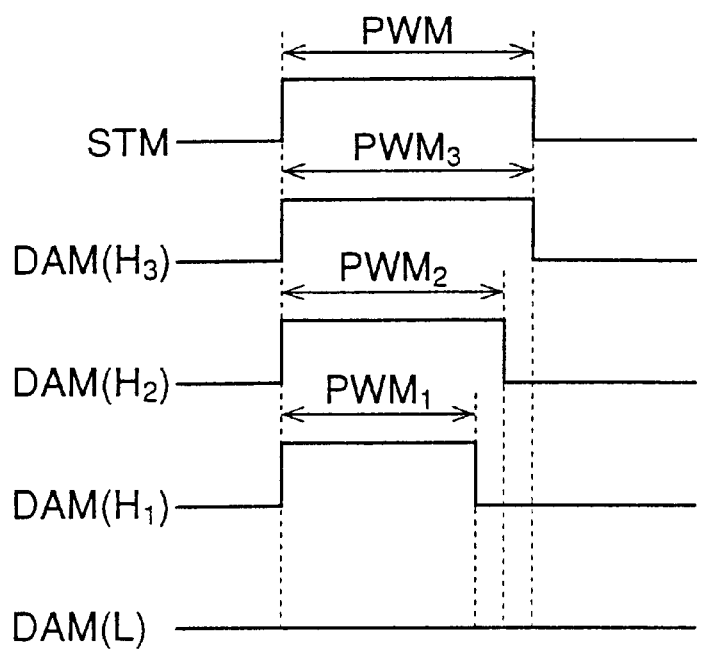
FIG. 14 is a timing chart showing a strobe signal and a control signal for electronically actuating another one of the thermal head driver circuits for producing a magenta dot on the image-forming substrate of FIG. 1.

Similarly, when the AND-gate circuit 50, as shown in FIG. 12, is one included in the second driver circuit 31M, a set of a strobe signal "STM" and a control signal "DAM" is outputted from the printer controller 40, and is then inputted to the input terminals of the AND-gate circuit 50. As shown in a timing chart of FIG. 14, the strobe signal "STM" has a pulse width "PWW", longer than the pulse width of the strobe signal "STC", and the control signal "DAM" is varied in accordance with binary values of a digital magenta image-pixel signal and a 2-bit digital gradation signal carried thereby, as shown in the previous TABLE.

Namely, when the digital magenta image-pixel signal has a value "0", and when the 2-bit digital gradation signal has a value [00], the control signal "DAM" is maintained at a low-level under control of the printer controller 40. When the digital magenta image-pixel signal has a value "1", the control signal "DAM" is outputted as a high-level pulse from the printer controller 40, and a pulse width of the high-level pulse is varied in accordance with a value of the 2-bit digital gradation signal concerned.

In particular, when the 2-bit digital gradation signal has a value of [11], the high-level pulse of the control signal "DAM" has the same pulse width "$PWM_3$" as the pulse width "PWW" of the strobe signal "STM", and a corresponding one of the electric resistance elements $R_{mn}$ is electrically energized during a period corresponding to the pulse width "$PWM_3$" of the high-level pulse of the control signal "DAM", whereby the electric resistance element concerned is heated to the temperature $t_{M3}$ (FIG. 5) between the glass-transition temperatures $T_2$ and $T_3$. Also, when the 2-bit digital gradation signal has a value of [10], the high-level pulse of the control signal "DAM" has a pulse width "$PWM_2$", shorter than the pulse width "$PWM_3$", and a corresponding one of the electric resistance elements Rmn is electrically energized during a period corresponding to the pulse width "$PWM_2$" of the high-level pulse of the control signal "DAM", whereby the electric resistance element concerned is heated to the temperature $t_{M2}$ (FIG. 5) between the glass-transition temperatures $T_2$ and $T_3$. Further, when the digital 2-bit gradation signal has a value of [01], the high-level pulse of the control signal "DAM" has a pulse width "PWM$_1$", shorter than the pulse width "PWM$_2$", and a corresponding one of the electric resistance elements R$_{mn}$ is electrically energized during a period corresponding to the pulse width "PWM$_1$" of the high-level pulse of the control signal "DAM", whereby the electric resistance element concerned is heated to the temperature t$_{M1}$ (FIG. 5) between the glass-transition temperatures T$_2$ and T$_3$.

Accordingly, the resistance element (R$_{m1}$, . . . , R$_{mn}$), corresponding to the digital magenta image-pixel signal having the value "1", is heated to one of the temperatures t$_{M1}$, t$_{M2}$ and t$_{M3}$, resulting in a production of a magenta dot on the image-forming sheet 10, due to the squashing and compacting of magenta microcapsules 12M, which are locally heated by the electric resistance element concerned. Thus, a magenta density of the produced magenta dot varies in accordance with the heating temperature (t$_{M1}$, t$_{M2}$, t$_{M3}$), thereby obtaining a variation in density (gradation) of the magenta dot. Of course, as the heating temperature (t$_{M1}$, t$_{M2}$, t$_{M3}$) increases, the magenta density of the magenta dot becomes higher, because the liquid magenta dye, encapsulated in a magenta microcapsule shell wall (12M), is subjected to a proportionally larger thermal expansion with regard to the rise in the heating temperature (t$_{M1}$, t$_{M2}$, t$_{M3}$)

Figure 15:
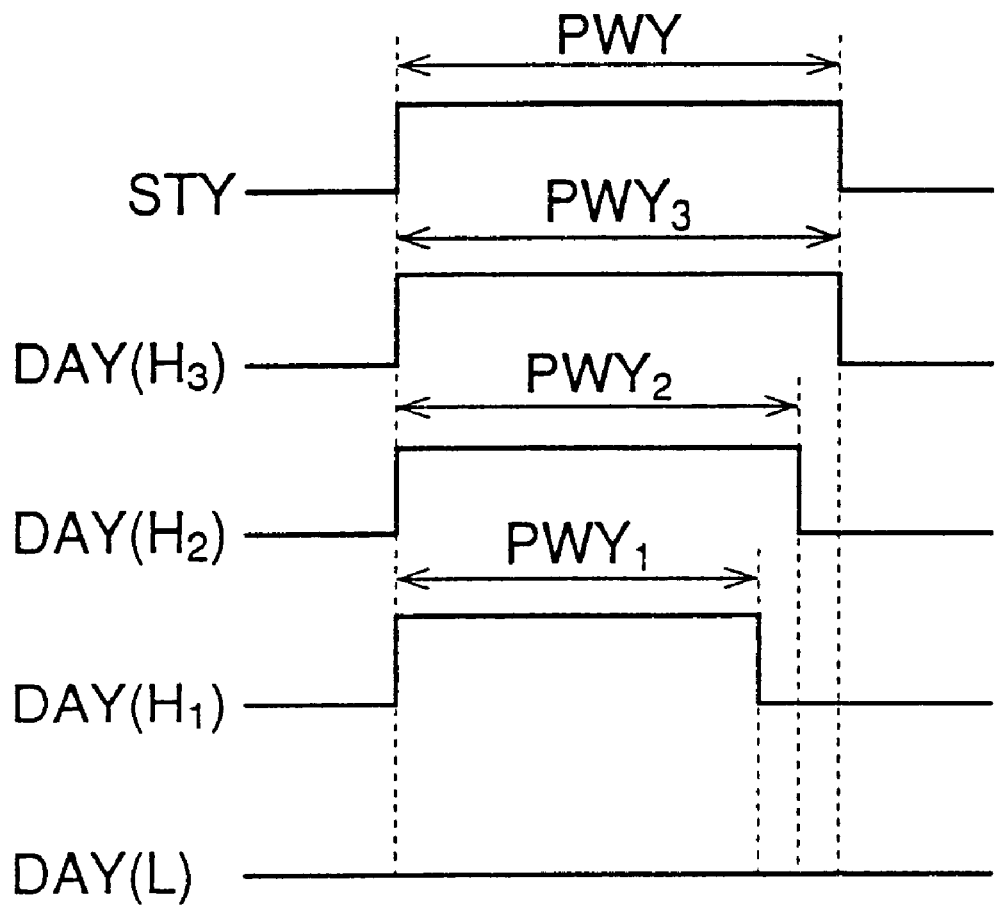
FIG. 15 is a timing chart showing a strobe signal and a control signal for electronically actuating the remaining thermal head driver circuit for producing a yellow dot on the image-forming substrate of FIG. 1.

Further, when the AND-gate circuit 50, as shown in FIG. 12, is one included in the third driver circuit 31Y, a set of a strobe signal "STY" and a control signal "DAY" is outputted from the printer controller 40, and is then inputted to the input terminals of the AND-gate circuit 50. As shown in a timing chart of FIG. 15, the strobe signal "STY" has a pulse width "PWY", longer than the pulse width of the strobe signal "STM", and the control signal "DAY" is varied in accordance with binary values of a digital yellow image-pixel signal and a digital 2-bit gradation signal carried thereby, as shown in the previous TABLE.

Namely, when the digital yellow image-pixel signal has a value "0", and when the digital 2-bit gradation signal has a value [00], the control signal "DAY" is maintained at a low-level under control of the printer controller 40. When the digital yellow image-pixel signal has a value "1", the control signal "DAY" is outputted as a high-level pulse from the printer controller 40, and a pulse width of the high-level pulse is varied in accordance a value of the digital 2-bit gradation signal concerned.

In particular, when the digital 2-bit gradation signal has a value of [11], the high-level pulse of the control signal "DAY" has the same pulse width "PWY$_3$" as the pulse width "PWY" of the strobe signal "STY", and a corresponding one of the electric resistance elements R$_{yn}$ is electrically energized during a period corresponding to the pulse width "PWY$_3$" of the high-level pulse of the control signal "DAY", whereby the electric resistance element concerned is heated to the temperature t$_{Y3}$ (FIG. 5) between the glass-transition temperature T$_3$ and the upper limit temperature T$_{UL}$. Also, when the digital 2-bit gradation signal has a value of [10], the high-level pulse of the control signal "DAY" has a pulse width "PWY$_2$", shorter than the pulse width "PWY$_3$", and a corresponding one of the electric resistance elements R$_{yn}$ is electrically energized during a period corresponding to the pulse width "PWY$_2$" of the high-level pulse of the control signal "DAY", whereby the electric resistance element concerned is heated to the temperature t$_{Y2}$ (FIG. 5) between the glass-transition temperature T$_3$ and the upper limit temperature T$_{UL}$. Further, when the digital 2-bit gradation signal has a value of [01], the high-level pulse of the control signal "DAY" has a pulse width "PWY$_1$", shorter than the pulse width "PWY$_2$", and a corresponding one of the electric resistance elements R$_{yn}$ is electrically energized during a period corresponding to the pulse width of the high-level pulse of the control signal "DAY", whereby the electric resistance element concerned is heated to the temperature t$_{Y1}$ (FIG. 5) between the glass-transition temperature T$_3$ and the upper limit temperature T$_{UL}$.

Accordingly, the electric resistance element (R$_{y1}$, . . . , R$_{yn}$), corresponding to the digital yellow image-pixel signal having the value "1", is heated to one of the temperatures t$_{Y1}$, t$_{Y2}$ and t$_{Y3}$, resulting in a production of a yellow dot on the image-forming sheet 10 due to the squashing and compacting of yellow microcapsules 12Y, which are locally heated by the electric resistance element concerned. Thus, a yellow density of the produced yellow dot varies in accordance with the heating temperature (t$_{Y1}$, t$_{Y2}$, t$_{Y3}$) thereby obtaining a variation in density (gradation) of the yellow dot. Of course, as the heating temperature (t$_{Y1}$, t$_{Y2}$, t$_{Y3}$) increases, the yellow density of the yellow dot becomes higher, because the liquid yellow dye, encapsulated in a yellow microcapsule 12Y, is subjected to a proportionally larger thermal expansion with regard to the rise in the heating temperature (t$_{Y1}$, t$_{Y2}$, t$_{Y3}$).

Note, the cyan, magenta and yellow dots, produced by the heated resistance elements R$_{cn}$, R$_{mn}$ and R$_{yn}$, have a dot size of about 50 μm to about 100 μm, and the cyan, magenta and yellow microcapsules 12C, 12M and 12Y are uniformly included in a dot area to be produced on the image-forming sheet 10.

Of course, according to the aforesaid color printer, it is possible to form a color image, having a color gradation, on the image-forming sheet 10 on the basis of a plurality of three-primary color dots obtained by selectively heating the electric resistance elements (R$_{c1}$ to R$_{cn}$; R$_{m1}$ to R$_{mn}$; and R$_{y1}$ to R$_{yn}$) in accordance with three-primary color digital image-pixel signals and the 2-bit digital gradation signals carried thereby. Namely, a certain dot of the color image, formed on the image-forming sheet 10, is obtained by a combination of cyan, magenta and yellow dots produced by corresponding electric resistance elements R$_{cn}$, R$_{mn}$ and R$_{yn}$.

Figure 16:
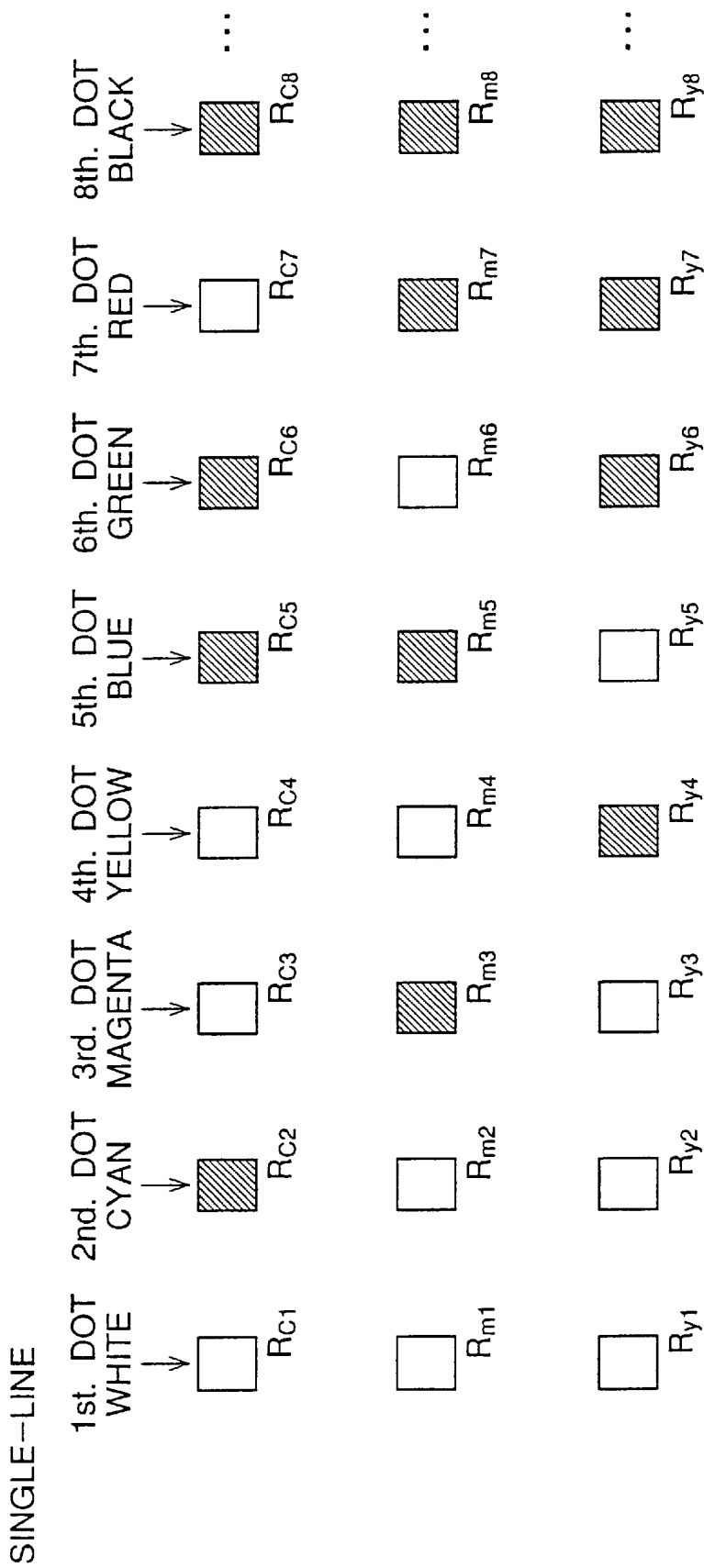
FIG. 16 is a conceptual view showing, by way of example, the production of color dots of a color image in the color printer of FIG. 6.

In particular, for example, as conceptually shown by FIG. 16, in a single-line of dots, forming a part of the color image, if a first dot is white, none of the electric resistance elements R$_{c1}$, R$_{m1}$ and R$_{y1}$ are heated. If a second dot is cyan, only the electric resistance element R$_{c2}$ is heated, and the remaining electric resistance elements R$_{m2}$ and R$_{y2}$ are not heated. If a third dot is magenta, only the resistance element R$_{m3}$ is heated, and the remaining resistance elements R$_{c3}$ and R$_{y3}$ are not heated. Similarly, if a fourth dot is yellow, only the resistance element R$_{y4}$ is heated, and the remaining resistance elements R$_{c4}$ and R$_{m4}$ are not heated.

Further, as shown in FIG. 16, if a fifth dot is blue, the electric resistance elements R$_{c5}$ and R$_{m5}$ are heated, and the remaining electric resistance element R$_{y5}$ is not heated. If a sixth dot is green, the resistance elements R$_{c6}$ and R$_{y6}$ are heated, and the remaining resistance element R$_{m6}$ is not heated. If a seventh dot is red, the resistance elements R$_{m7}$ and $R_{y7}$ are heated, and the remaining resistance element $R_{c7}$ is not heated. If an eighth dot is black, all of the resistance elements $R_{c8}$, $R_{m8}$ and $R_{y8}$ are heated. Note, of course, each of the produced color dots can exhibit a color gradation in accordance with a corresponding 2-bit gradation signal.

Figure 17:
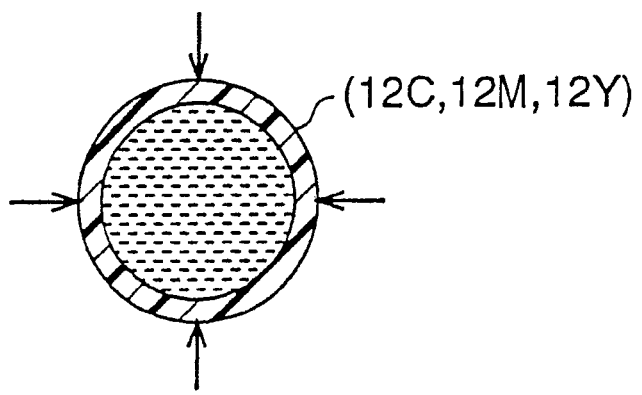
FIG. 17 is a view for explaining a second embodiment of a process for fissuring a shell wall of a microcapsule, according to a second embodiment of the present invention.
Figure 18:
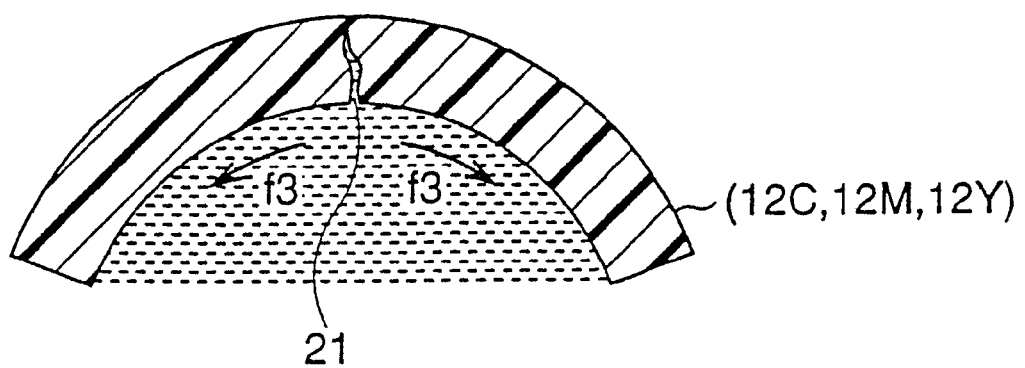
FIG. 18 is another view for explaining the second embodiment of the fissuring process shown in FIG. 17.

FIGS. 17 and 18 show a second embodiment of the fissuring process, according to the present invention, for cracking and fissuring the microcapsules (12C, 12M, 12Y), initially having no cracks and fissures. In this process, each of the microcapsules (12C, 12M, 12Y) is suddenly and drastically cooled with, for example, liquid nitrogen, so that only the microcapsule shell wall abruptly hardens and contracts, as indicated by arrows in FIG. 17. Thus, an inner surface of the microcapsule shell wall is subjected to inner tensile forces $f_3$ so that an inner fissure 21 is generated at a weakened location on the inner surface thereof, as shown in FIG. 18, due to a brittleness of the hardened microcapsule shell wall at a low temperature.

Figure 19:
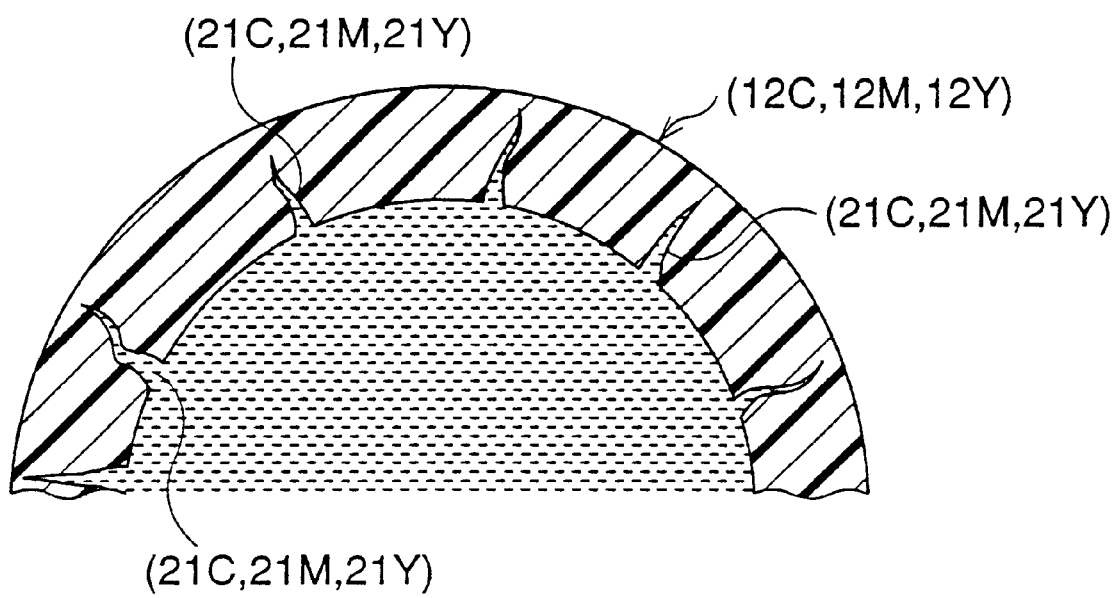
FIG. 19 is an enlarged schematic cross-sectional view of the microcapsule obtained by the second embodiment of the fissuring process shown in FIGS. 17 and 18.

Of course, the sudden and drastic cooling of the microcapsule is regulated such that the inner fissure 21 does not completely pass through the microcapsule shell wall, i.e. is a bottomed fissure. In short, as shown in FIG. 19, according to the second embodiment of the fissuring process, it is possible to obtain the microcapsules (12C, 12M, 12Y), having the inner fissures (21C, 21M, 21Y), which are referred to as a second embodiment of the microcapsules according to the present invention, hereinafter.

Similar to the first embodiment of the microcapsules, according to this second embodiment, when each of the microcapsules (12C, 12M, 12Y) is squashed and compacted by the corresponding heating temperature and the corresponding compacting pressure, which falls in the hatched area (C, M, Y), as defined in FIG. 5, the inner fissures (21C, 21M, 21Y) completely pass through the microcapsule shell wall, i.e. become through-hole fissures, so that the liquid dye seeps from the microcapsule (12C, 12M, 12Y) through the opened inner fissures (21C, 21M, 21Y). Also, the seepage of the liquid dye from the squashed and compacted microcapsule (12C, 12M, 12Y) through the opened inner fissures (21C, 21M, 21Y) can be performed without any complete breakage of the microcapsule (12C, 12M, 12Y), and thus it is possible to adjust an amount of the seepage of the liquid dye by regulating a temperature to be applied to the microcapsule (12C, 12M, 12Y), similar to the first embodiment of the microcapsules, shown in FIGS. 3 5 and 6.

Figure 20:
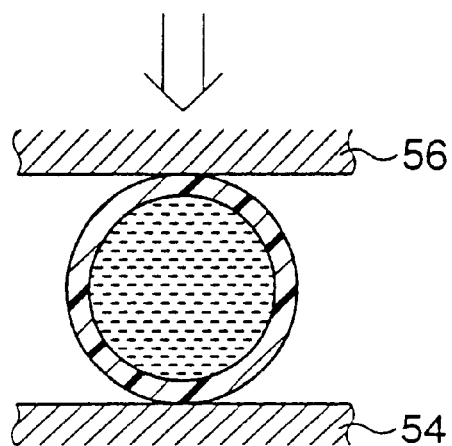
FIG. 20 is a view for explaining a third embodiment of process for fissuring a shell wall of a microcapsule, according to a third embodiment of the present invention.
Figure 21:
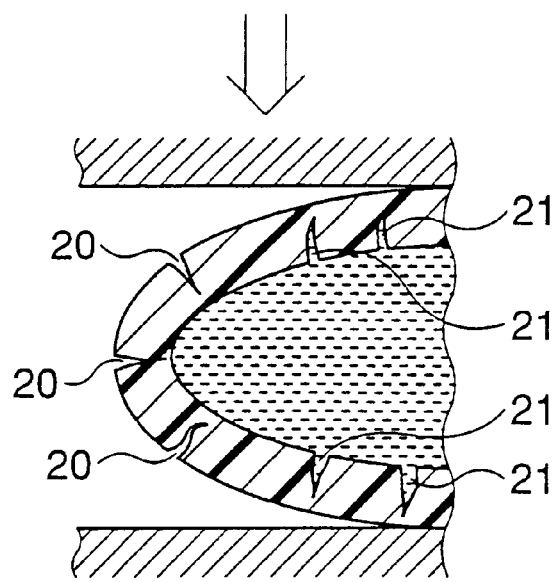
FIG. 21 is another view for explaining the third embodiment of the fissuring process shown in FIG. 20.

FIGS. 20 and 21 show a third embodiment of the fissuring process, according to the present invention, for cracking and fissuring the microcapsules (12C, 12M, 12Y), initially having no cracks and fissures. In this third embodiment of the fissuring process, the microcapsules (12C, 12M, 12Y) are left at a low temperature of, for example, −20° C., and the liquid dye, encapsulated therein, is frozen. Then, the microcapsules (12C, 12M, 12Y) are subjected to pressure by a mechanical press having a fixed plate 54 and a press plate 56, as shown in FIG. 20. Namely, the microcapsules (12C, 12M, 12Y) are placed on the fixed plate 54, and the press plate 56 exerts a suitable force F on the microcapsules (12C, 12M, 12Y) until each of the microcapsules (12C, 12M, 12Y) is deformed into an oval shape in a longitudinal-section, as shown in FIG. 21. Thus, a peripheral outer surface area of the deformed microcapsule shell wall is subjected to high outer tensile forces so that outer fissures 20 are generated at weakened locations on the peripheral outer surface thereof. On the other hand, both top and bottom inner surface areas of the deformed microcapsule shell wall are also subjected to high inner tensile forces so that inner fissures 21 are generated at weakened locations on both the top and bottom inner surface areas thereof.

Figure 22:
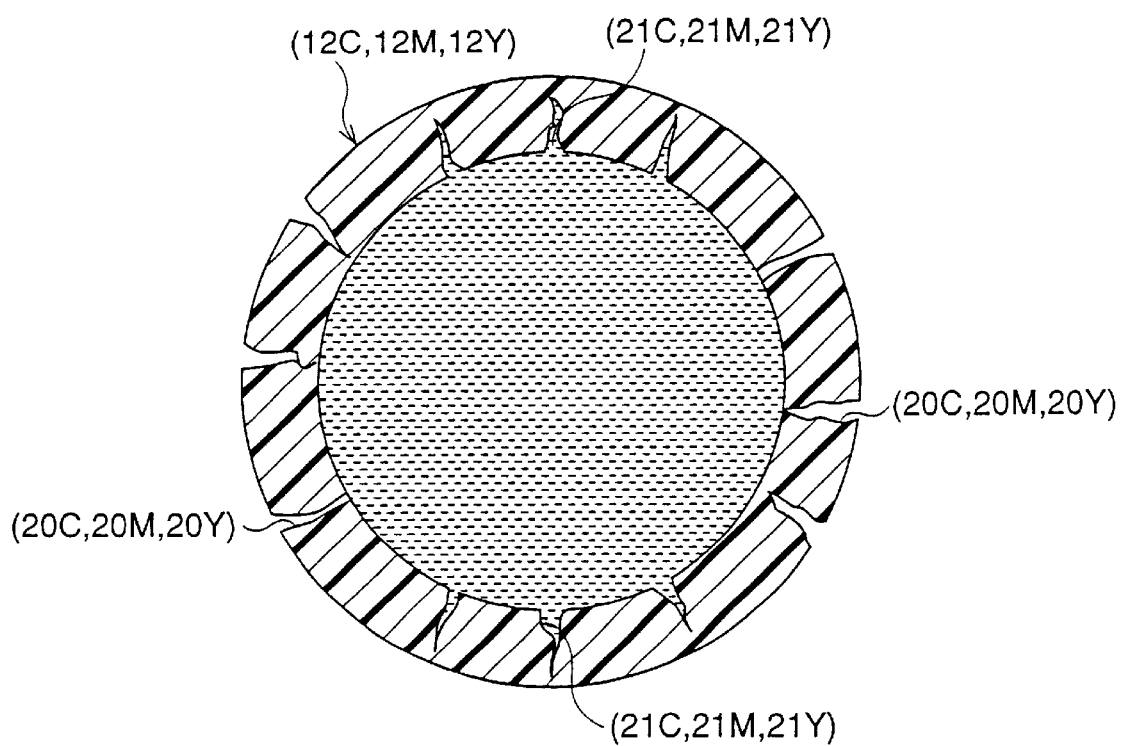
FIG. 22 is an enlarged schematic cross-sectional view of the microcapsule obtained by the third embodiment of the fissuring process shown in FIGS. 20 and 21.

Of course, the pressing force F is regulated such that the outer and inner fissures 20 and 21 do not completely pass through the shell wall of a given microcapsule. In short, as shown in FIG. 22, according to the third embodiment of the fissuring process, it is possible to obtain the microcapsules (12C, 12M, 12Y), having the outer fissures (20C, 20M, 20Y) and the inner fissures (21C, 21M, 21Y), which are referred to as a third embodiment of the microcapsules according to the present invention, hereinafter.

Similar to the first embodiment of the microcapsules, according to this third embodiment, when each of the microcapsules (12C, 12M, 12Y) is squashed and compacted by the corresponding heating temperature and the corresponding compacting pressure, which falls in the respective hatched area (C, M, Y) defined in FIG. 5, the outer fissures (20C, 20M, 20Y) and the inner fissures (21C, 21M, 21Y) completely pass through the microcapsule shell wall, so that the liquid dye seeps from the microcapsule (12C, 12M, 12Y) through the opened outer and inner fissures (20C, 20M, 20Y; 21C, 21M, 21Y). Also, the seepage of the liquid dye from the squashed and compacted microcapsule (12C, 12M, 12Y) through the opened outer and inner fissures (20C, 20M, 20Y; 21C, 21M, 21Y) can be performed without any complete breakage of the microcapsule (12C, 12M, 12Y), and thus it is possible to adjust an amount of seepage of the liquid dye by regulating a temperature to be applied to the microcapsule (12C, 12M, 12Y), similar to the first embodiment of the microcapsules, shown in FIGS. 3 and 6.

Figure 23:
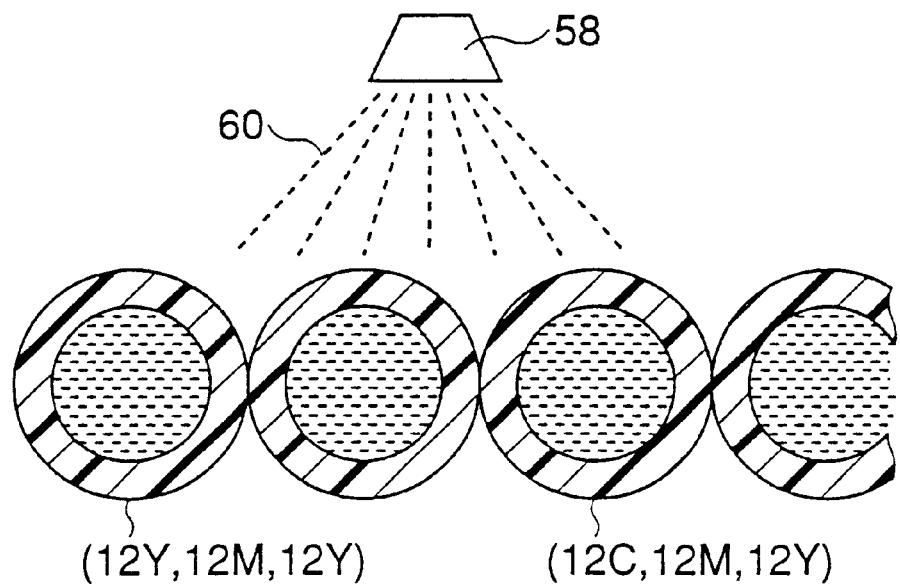
FIG. 23 is a view for explaining a fourth embodiment of a process for fissuring a shell wall of a microcapsule, according to a fourth embodiment of the present invention.
Figure 24:
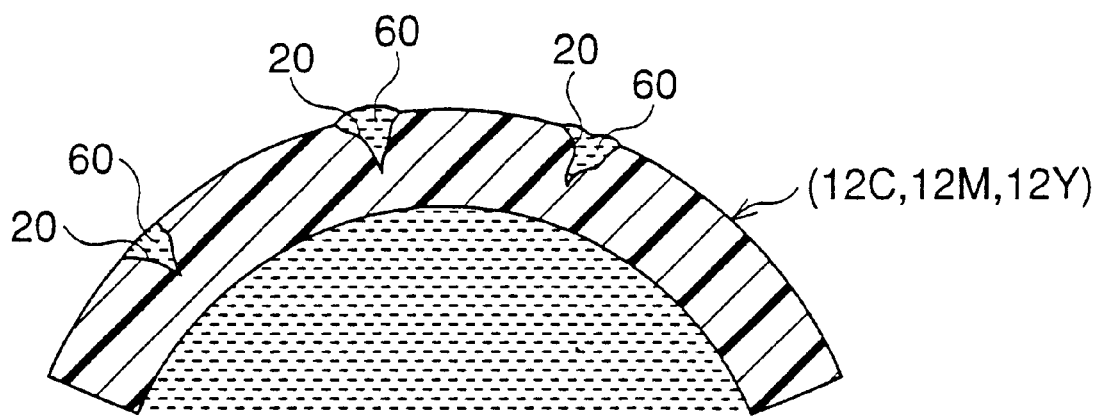
FIG. 24 is another view for explaining the fourth embodiment of the fissuring process shown in FIG. 23.

FIGS. 23 and 24 show a fourth embodiment of the fissuring process, according to the present invention, for cracking and fissuring the microcapsules (12C, 12M, 12Y), initially having no cracks and fissures.

In this fourth embodiment of the fissuring process, the microcapsules (12C, 12M, 12Y) are chemically treated such that they are cracked and fissured. In particular, the microcapsules (12C, 12M, 12Y) are sprayed with a corrosive liquid 60, such as a solution of surface-active agent, gasoline, mineral oil or the like, by using spray equipment 58, as shown in FIG. 23. It is well known that these corrosive liquids cause a so-called environmental stress cracking in a synthetic resin material. Thus, as shown in FIG. 24, outer fissures 20 chemically develop over an outer surface of the shell wall of the microcapsules (12C, 12M, 12Y), due to the environmental stress-crack phenomenon.

Figure 25:
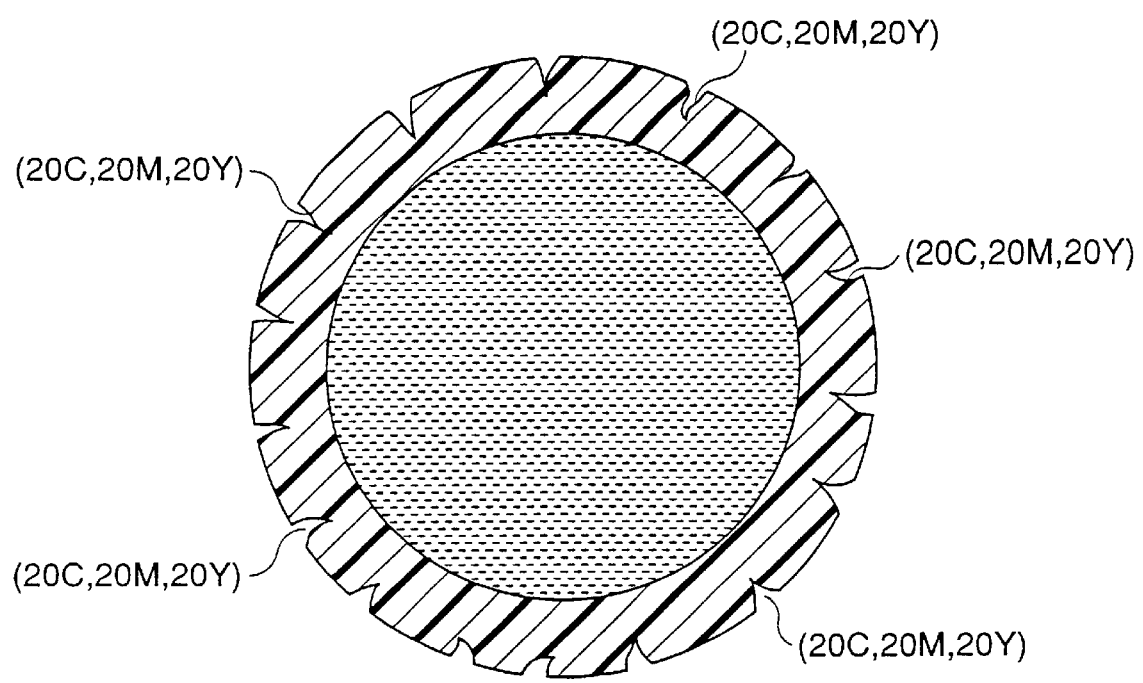
FIG. 25 is an enlarged schematic cross-sectional view of the microcapsule obtained by the fourth embodiment of the fissuring process shown in FIGS. 23 and 24.

Of course, the chemical treatment of the microcapsules (12C, 12M, 12Y) is halted by washing off the corrosive liquid 60 from the microcapsules before the outer fissures 20 completely pass through the shell wall of the microcapsule. In short, as shown in FIG. 25, according to the fourth embodiment of the fissuring process, it is possible to obtain the microcapsules (12C, 12M, 12Y), having the outer fissures (20C, 20M, 20Y), which are referred to as a fourth embodiment of the microcapsules according to the present invention, hereinafter.

Similar to the first embodiment of the microcapsules, according to this fourth embodiment, when each of the microcapsules (12C, 12M, 12Y) is squashed and compacted by the corresponding heating temperature and the corresponding compacting pressure, which falls in the respective hatched area (C, M, Y) defined in FIG. 5, the outer fissures (20C, 20M, 20Y) completely pass through the microcapsule shell wall, so that the liquid dye seeps from the microcapsule (12C, 12M, 12Y) through the opened outer fissures (20C, 20M, 20Y). Also, the seepage of the liquid dye from the squashed and compacted microcapsule (12C, 12M, 12Y) through the opened outer fissures (20C, 20M, 20Y) can be performed without any complete breakage of the microcapsule (12C, 12M, 12Y), and thus it is possible to adjust an amount of seepage of the liquid dye by regulating a temperature to be applied to the microcapsule (12C, 12M, 12Y), similar to the first embodiment of the microcapsules, shown in FIGS. 3 and 6.

Figure 26:
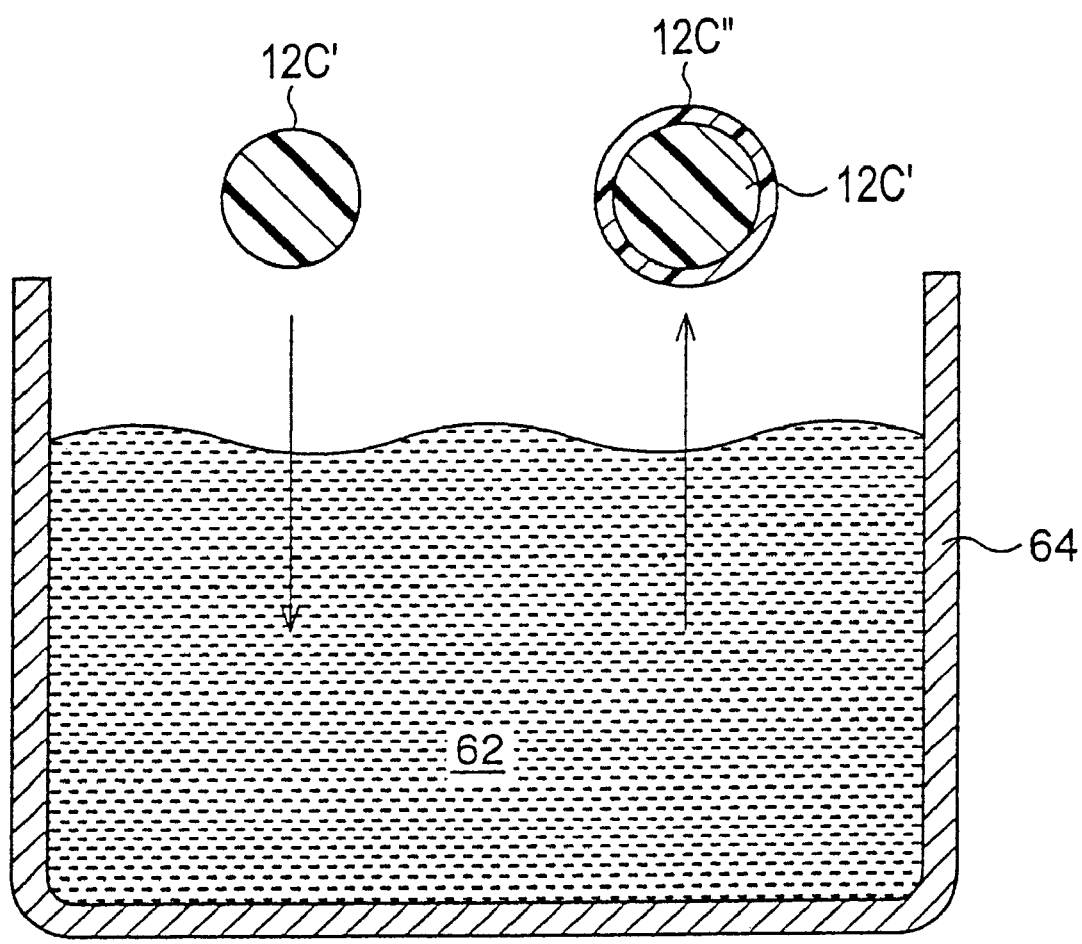
FIG. 26 is a schematic view showing a method of producing a microcapsule encapsulating a wax-type dye, exhibiting a semi-solid or solid phase.

FIG. 26 shows another method of producing the cyan, magenta and yellow microcapsules 12C, 12M and 12Y, initially having no fissures, each of which encapsulates a wax-type of dye, exhibiting a semi-solid phase or solid phase.

In particular, for example, as representatively shown in FIG. 26, cyan particles 12C', having an average diameter of several microns (5 $\mu$m to 10 $\mu$m), are formed of a wax-type cyan dye material which is thermally fused at at least a temperature higher than the glass-transition temperature $T_1$, as indicated in the graph of FIG. 5. The cyan particles 12C' are dipped in a body of shape memory resin solution 62 held in a suitable vessel 64, and are then dryed such that a shape memory resin shell wall 12C" is defined around each of the cyan particles 12C'. Of course, the shape memory resin, contained in the solution 62, exhibits the characteristic longitudinal elasticity coefficient indicated by the solid line in the graph of FIG. 5. Also, by suitably regulating a concentration of shape memory resin in the solution 62, and by sutitably regulating a number of dipping times of the cyan particles 12C' in the solution 62, it is possible to obtain the desired thickness $W_C$ (FIG. 3) of the shape memory resin shell wall 12C".

Similarly, the magenta microcapsules 12M can be produced by using a wax type magenta dye material, which is thermally fused at at least a temperature higher than the glass-transition temperature $T_2$, indicated in the graph of FIG. 5. Of course, a shape memory resin shell wall of the produced magenta microcapsules 12M will have the desired thickness $W_M$ (FIG. 3), and exhibit the characteristic longitudinal elasticity coefficient, indicated by the single-chained line in the graph of FIG. 5. Further, the yellow microcapsules 12Y can be produced by using a wax-type yellow dye material, which is thermally fused at at least temperature higher than the glass-transition temperature $T_3$, indicated in the graph of FIG. 5, with a shape memory resin shell wall of the produced yellow microcapsules 12Y having the desired thickness $W_Y$ (FIG. 3), and exhibiting the characteristic longitudinal elasticity coefficient indicated by the double-chained line in the graph of FIG. 5.

The produced microcapsules (12C, 12M, 12Y), having no fissures and containing the wax-type dye, may be cracked and fissured by one of the second, third and fourth embodiments of the fissuring process according to the present invention.

According to another aspect of the present invention, the microcapsules (12C, 12M, 12Y) are formed with a plurality of fine depressions over an outer surface of the shell wall thereof, in place of the cracks or fissures, which is referred to as a fifth embodiment of the microcapsules according to the present invention, hereinafter.

Figure 27:
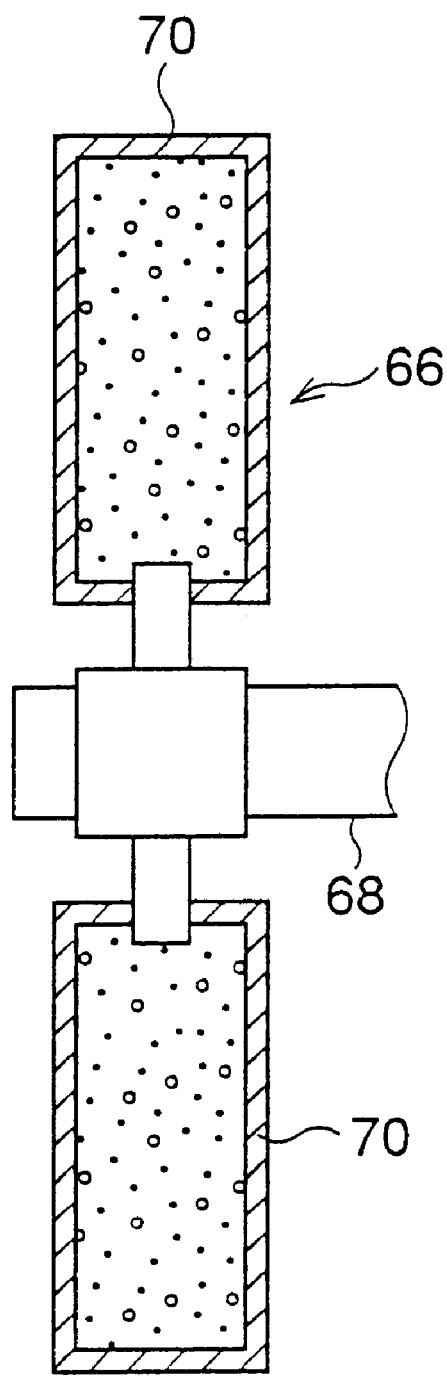
FIG. 27 is a partial cross-sectional view of a centrifugal mixer for mixing fine ceramic particles and microcapsules, used when producing microcapsules according to a fifth embodiment of the present invention.

In particular, the microcapsules (12C, 12M, 12Y), which are produced in accordance with one of the above-mentioned production methods, are mixed with fine white ceramic particles, having an average diameter of, for example, 0.1 $\mu$m, by using a centrifugal mixer 66, as shown in FIG. 27. Namely, the centrifugal mixer 66 comprises a rotating shaft 68, and cylindrical containers 70 fixed on the rotating shaft 68, and a mixture of the microcapsules (12C, 12M, 12Y) and the fine ceramic particles is placed in each of the cylindrical containers 70.

Figure 28:
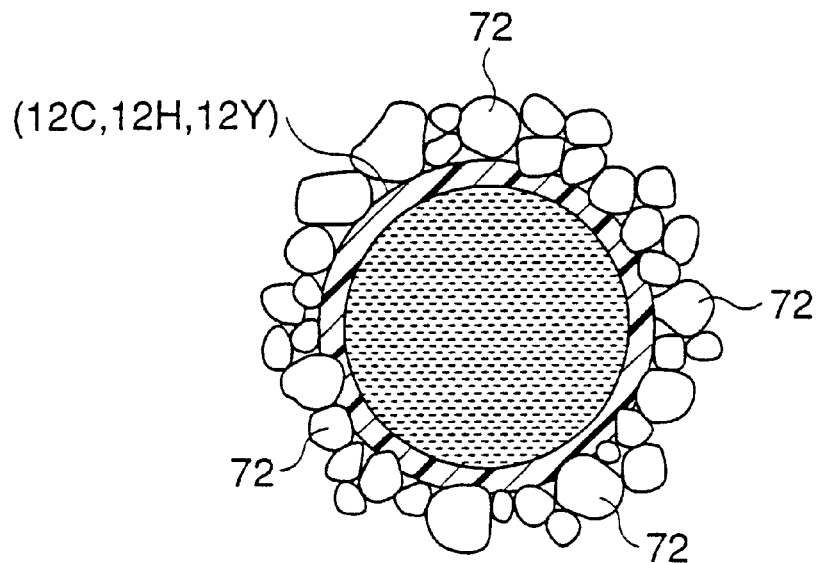
FIG. 28 is a view for explaining an embodiment of a process for forming a microcapsule with fine white ceramic particles cohered thereto, according to a fifth embodiment of the present invention.

During the rotation of the containers 70, the fine ceramic particles abrasively contact the microcapsules (12C, 12M, 12Y), causing coherence, due to triboelectrification acting therebetween, as shown in FIG. 28 in which the cohered fine ceramic particles are indicated by reference 72. As is apparent from this drawing, a part of the cohered fine ceramic particles 72 is embedded in the shell wall of the microcapsules (12C, 12M, 12Y), and a plurality of small spaces is defined among the cohered fine ceramic particles 72 around the outer surface of the shell wall of the microcapsules (12C, 12M, 12Y).

Figure 29:
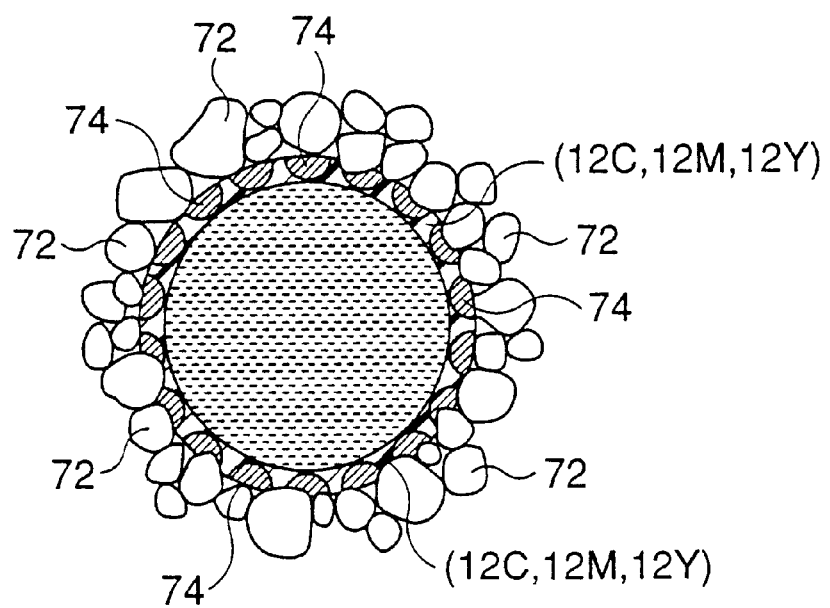
FIG. 29 is another view for explaining the fifth embodiment of the process shown in FIG. 28.

The microcapsules (12C, 12M, 12Y) with the cohered fine ceramic particles 72 are immersed in a suitable solvent, such as acetone, over a predetermined period of time, and thus a plurality of fine speckle-like depressions 74 is formed over the outer surface of the shell wall of the microcapsules (12C, 12M, 12Y) at locations corresponding to the plurality of small spaces defined around the outer surface of the microcapsule shell wall (FIG. 29), due to the immersion of the microcapsules in the solvent. Note, in this drawing, each of the fine speckle-like depressions 74, filled with the solvent, is indicated as a hatched zone. Then, the microcapsules (12C, 12M, 12Y) are withdrawn from the solvent, and the retained solvent is washed off from the microcapsules (12C, 12M, 12Y), as shown in FIG. 30.

The period of time, over which the microcapsules (12C, 12M, 12Y) are immersed in the solvent, is regulated such that the fine speckle-like depressions 74 do not completely pass through the shell wall of the microcapsules. Namely, as best shown in FIG. 31, each of the fine speckle-like depressions 74 has a considerably thin wall section 76 at the bottom area thereof.

Thus, similar to the above-mentioned embodiments of the microcapsules having the fissures, according to this fifth embodiment, when each of the microcapsules (12C, 12M, 12Y) is squashed and compacted by the corresponding heating temperature and the corresponding compacting pressure, which fall in the hatched areas (C, M, Y) defined in FIG. 5, the fine speckle-like depressions 74 completely pass through the microcapsule shell wall, i.e. become through-holes, so that the liquid dye seeps from the squashed and compacted microcapsule (12C, 12M, 12Y) through the opened fine speckle-like depressions 74. Also, the seepage of the liquid dye from the squashed and compacted microcapsule (12C, 12M, 12Y) through the opened fine speckle-like depressions 74 can be performed without any complete breakage of the microcapsule (12C, 12M, 12Y), and thus it is possible to adjust an amount of the seepage of the liquid dye by regulating a temperature to be applied to the microcapsule (12C, 12M, 12Y), similar to the embodiments of the microcapsules having the cracks or fissures.

Figure 30:
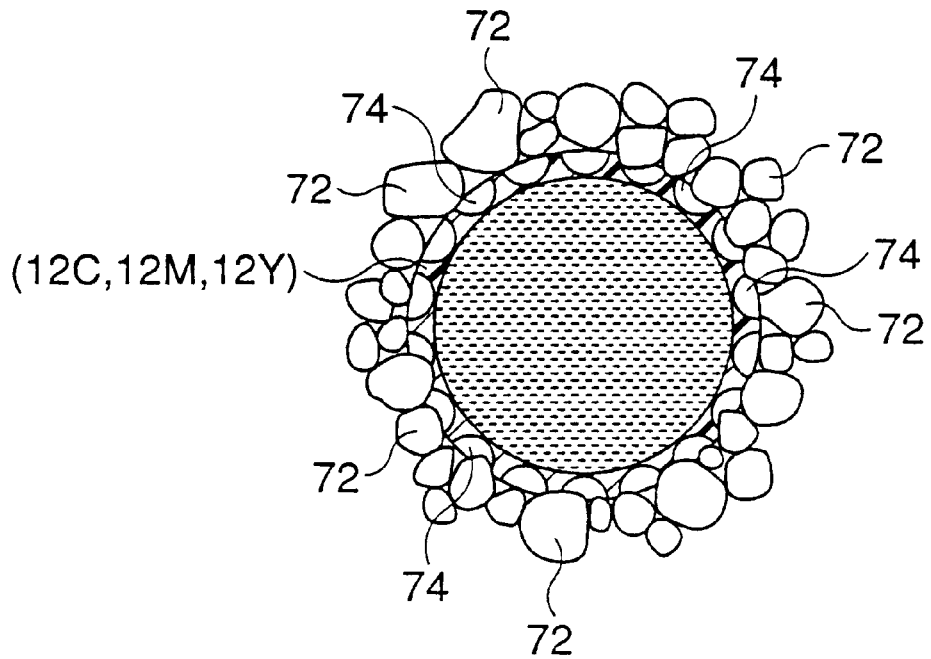
FIG. 30 is yet another view for explaining the fifth embodiment of the process shown in FIG. 28.
Figure 31:
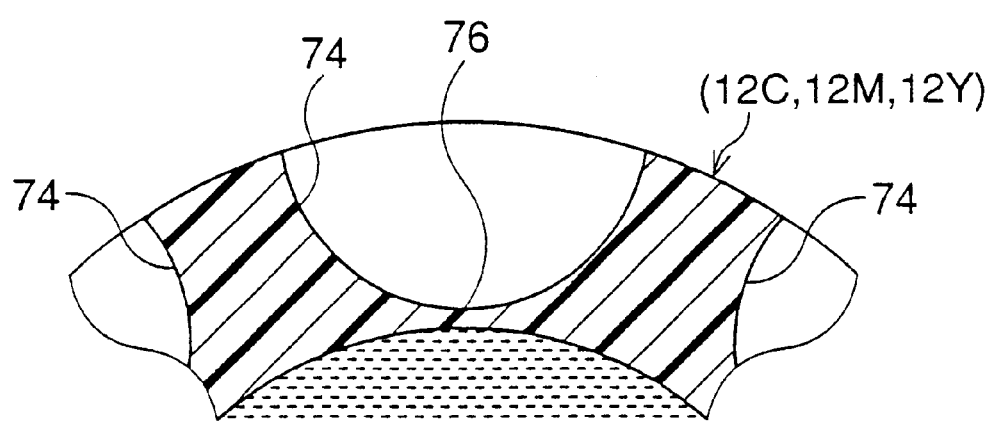
FIG. 31 is an enlarged schematic cross-sectional view of the microcapsule obtained by the process shown in FIGS. 27 to 30.

Note, in this fifth embodiment of the microcapsules, as shown in FIGS. 30 and 31, the microcapsules (12C, 12M, 12Y), carrying the cohered fine ceramic particles 74, are utilized to form the microcapsules layer 16 of the image-forming substrate 10.

Although all of the above-mentioned embodiments are directed to a formation of a color image, the present invention may be applied to a formation of a monochromatic image. In this case, a layer of microcapsules (16) is composed of only one type of microcapsule filled with, for example, a black ink.

Also, for the formation of the layer of microcapsules 16, a mixture of microcapsules, having neither fissures nor fine speckle-like depressions, and microcapsules, having either the fissures or the fine speckle-like depressions, may be utilized. Of course, in this case, it is also possible to adjust an amount of dye to be discharged, due to the existence of the microcapsules, having either the fissures or the fine speckle-like depressions.

Finally, it will be understood by those skilled in the art that the foregoing description is of preferred embodiments of the image-forming substrate, and that various changes and modifications may be made to the present invention without departing from the spirit and scope thereof.

The present disclosure relates to subject matters contained in Japanese Patent Applications No. 9-309732 (filed on Oct. 24, 1997) and No. 9-345864 (filed on Dec. 1, 1997) which are expressly incorporated herein, by reference, in their entireties.

What is claimed is:

1. A process for forming speckle-shaped depressions over an outer surface of a shell wall of a microcapsule encapsulating a dye, which comprises:

cohering ceramic particles to said microcapsule, due to triboelectrification acting therebetween, such that a plurality of spaces are defined among the cohered ceramic particles around the outer surface of said shell wall;

immersing said microcapsule with the cohered ceramic particles in a solvent over a predetermined period of time such that a plurality of speckle-shaped depressions is formed in the outer surface of said shell wall at locations corresponding to said plurality of spaces defined around the outer surface of said shell wall;

withdrawing said microcapsule with the cohered ceramic particles from said solvent; and washing off retained solvent from said microcapsule with the cohered ceramic particles, wherein said period of time, over which said microcapsule with the cohered ceramic particles is immersed in said solvent, is regulated such that said speckle-shaped depressions do not completely pass through said shell wall.

* * * * *